(12) United States Patent
West

(10) Patent No.: US 8,482,209 B2
(45) Date of Patent: *Jul. 9, 2013

(54) CIRCUITRY FOR PORTABLE LIGHTING DEVICES AND PORTABLE RECHARGEABLE ELECTRONIC DEVICES

(75) Inventor: Stacey West, Upland, CA (US)

(73) Assignee: Mag Instrument, Inc., Ontario, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/373,802

(22) Filed: Jan. 20, 2010

(65) Prior Publication Data

US 2012/0133296 A1    May 31, 2012

Related U.S. Application Data

(63) Continuation of application No. 11/351,307, filed on Feb. 8, 2006, now Pat. No. 7,723,921, which is a continuation-in-part of application No. 11/007,771, filed on Dec. 7, 2004, now Pat. No. 7,579,782.

(51) Int. Cl.
*H05B 37/00* (2006.01)
(52) U.S. Cl.
USPC .......... 315/200 A; 315/291; 315/307
(58) Field of Classification Search
USPC .......... 315/185 S, 200 A, 291, 294, 307–308
See application file for complete search history.

(56) References Cited

U.S. PATENT DOCUMENTS

| | | |
|---|---|---|
| 2,876,410 A | 3/1959 | Fry |
| 3,281,637 A | 10/1966 | Haltquist |
| 3,521,050 A | 7/1970 | Shagena |
| 3,825,740 A | 7/1974 | Friedman et al. |
| 3,829,676 A | 8/1974 | Nelson et al. |
| 3,835,272 A | 9/1974 | Wisenbaker |
| RE29,047 E | 11/1976 | Brindley |
| 4,092,580 A | 5/1978 | Prinsze |
| 4,114,187 A | 9/1978 | Uke |
| 4,115,842 A | 9/1978 | Keller |
| 4,126,810 A | 11/1978 | Cox |
| 4,139,794 A | 2/1979 | Malm et al. |
| 4,171,534 A | 10/1979 | Strowe |
| 4,194,143 A | 3/1980 | Farkas et al. |
| 4,203,150 A | 5/1980 | Shamlian |
| 4,244,011 A | 1/1981 | Hammel et al. |
| 4,286,311 A | 8/1981 | Maglica |
| 4,325,107 A | 4/1982 | MacLeod |
| 4,327,401 A | 4/1982 | Silberg |
| 4,357,648 A | 11/1982 | Nelson |
| 4,357,651 A | 11/1982 | Mayer |
| 4,388,673 A | 6/1983 | Maglica |

(Continued)

FOREIGN PATENT DOCUMENTS

| | | |
|---|---|---|
| JP | 1990-097795 | 8/1990 |
| JP | 1999-068532 A | 3/1999 |

(Continued)

*Primary Examiner* — Tung X Le

(74) *Attorney, Agent, or Firm* — Maceiko IP

(57) ABSTRACT

A portable electronic device, such as a flashlight, with a circuit for reducing the initial surge of current that is sent through the lamp filament when a flashlight is turned on is provided. The circuit reduces the stresses placed on the lamp bulb when it is turned on, thereby extending the life expectancy of the lamp bulb. A flashlight with beacon mode that produces light according to a duty cycle of less than 11% is also disclosed.

12 Claims, 12 Drawing Sheets

U.S. PATENT DOCUMENTS

| | | | |
|---|---|---|---|
| 4,398,139 A | 8/1983 | Prinsze | |
| 4,398,232 A | 8/1983 | Elmore | |
| 4,398,238 A | 8/1983 | Nelson | |
| 4,429,351 A | 1/1984 | Petzl et al. | |
| 4,479,191 A | 10/1984 | Nojima et al. | |
| 4,514,790 A | 4/1985 | Will | |
| 4,531,178 A | 7/1985 | Uke | |
| 4,577,263 A | 3/1986 | Maglica | |
| 4,605,993 A | 8/1986 | Zelina, Jr. | |
| 4,656,565 A | 4/1987 | Maglica | |
| 4,658,336 A | 4/1987 | Maglica | |
| 4,819,141 A | 4/1989 | Maglica et al. | |
| 4,823,242 A | 4/1989 | Maglica et al. | |
| 4,825,345 A * | 4/1989 | Stevens | 362/183 |
| 4,843,298 A | 6/1989 | Brauch et al. | |
| 4,873,160 A | 10/1989 | Miyazaki et al. | |
| 4,885,668 A | 12/1989 | Maglica et al. | |
| 4,899,265 A | 2/1990 | Maglica | |
| 4,914,555 A | 4/1990 | Gammache | |
| 4,922,178 A | 5/1990 | Matuszewski et al. | |
| 4,999,750 A | 3/1991 | Gammache | |
| 5,003,440 A | 3/1991 | Maglica | |
| 5,008,785 A | 4/1991 | Maglica et al. | |
| 5,121,308 A | 6/1992 | Maglica et al. | |
| 5,164,636 A * | 11/1992 | Allaire | 315/200 A |
| 5,193,898 A | 3/1993 | Maglica et al. | |
| 5,260,858 A | 11/1993 | Maglica | |
| 5,267,130 A | 11/1993 | Maglica et al. | |
| 5,390,091 A | 2/1995 | Maglica | |
| 5,455,752 A | 10/1995 | Maglica et al. | |
| 5,528,472 A | 6/1996 | Maglica et al. | |
| 5,560,705 A | 10/1996 | Shiau | |
| 5,806,964 A | 9/1998 | Maglica | |
| 5,821,697 A | 10/1998 | Weber | |
| 5,833,354 A | 11/1998 | Maglica | |
| 5,836,672 A | 11/1998 | Maglica et al. | |
| 5,859,506 A | 1/1999 | Lemke | |
| 6,086,219 A | 7/2000 | Maglica et al. | |
| 6,206,541 B1 | 3/2001 | Landamia | |
| 6,246,184 B1 | 6/2001 | Salerno | |
| 6,249,089 B1 | 6/2001 | Bruwer | |
| 6,283,609 B1 | 9/2001 | Parsons et al. | |
| 6,296,367 B1 | 10/2001 | Parsons et al. | |
| 6,296,368 B1 | 10/2001 | Maglica et al. | |
| 6,316,911 B1 | 11/2001 | Moskowitz et al. | |
| 6,347,878 B1 | 2/2002 | Shiao | |
| 6,357,893 B1 | 3/2002 | Belliveau | |
| 6,457,840 B2 | 10/2002 | Maglica et al. | |
| 6,488,390 B1 | 12/2002 | Lebens et al. | |
| 6,563,269 B2 | 5/2003 | Robinett et al. | |
| 6,621,225 B2 | 9/2003 | Bruwer | |
| 7,015,654 B1 | 3/2006 | Kuhlmann et al. | |
| 7,122,973 B1 * | 10/2006 | Ivers | 315/291 |
| 7,215,084 B1 * | 5/2007 | Sharrah et al. | 315/87 |
| 7,265,494 B2 | 9/2007 | Bruwer | |
| 7,291,940 B2 | 11/2007 | Bruwer | |
| 2003/0057875 A1 | 3/2003 | Inochkin et al. | |
| 2004/0021427 A1 | 2/2004 | Bruwer et al. | |
| 2004/0085026 A1 | 5/2004 | Inochkin et al. | |
| 2005/0002186 A1 | 1/2005 | Krieger et al. | |
| 2005/0007777 A1 | 1/2005 | Klipstein et al. | |
| 2005/0040773 A1 | 2/2005 | Lebens et al. | |
| 2005/0047125 A1 | 3/2005 | Puckett | |
| 2005/0083626 A1 | 4/2005 | Bruwer | |
| 2005/0083683 A1 | 4/2005 | Ho et al. | |
| 2005/0088843 A1 | 4/2005 | Chapman | |
| 2005/0168158 A1 | 8/2005 | Inochkin et al. | |
| 2005/0174782 A1 | 8/2005 | Chapman | |
| 2006/0028811 A1 | 2/2006 | Ross et al. | |
| 2006/0082321 A1 | 4/2006 | Van Deursen et al. | |
| 2007/0133199 A1 | 6/2007 | Lebens et al. | |

FOREIGN PATENT DOCUMENTS

| | | |
|---|---|---|
| JP | 2001-101901 | 4/2001 |
| JP | 2004-055460 | 2/2004 |
| JP | 2004-253226 | 9/2004 |
| WO | WO/00/22890 | 4/2000 |

* cited by examiner

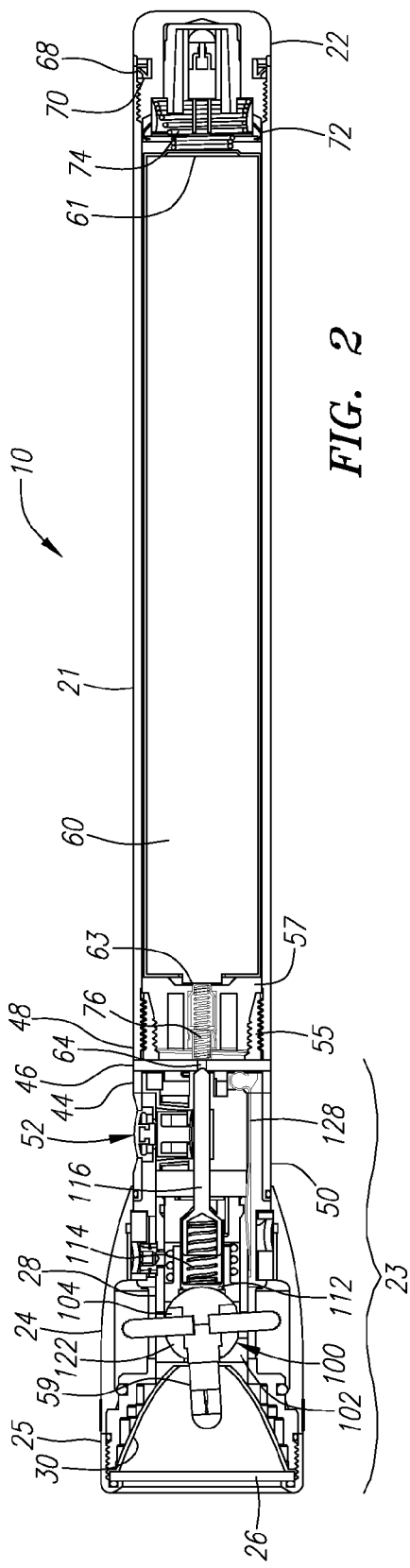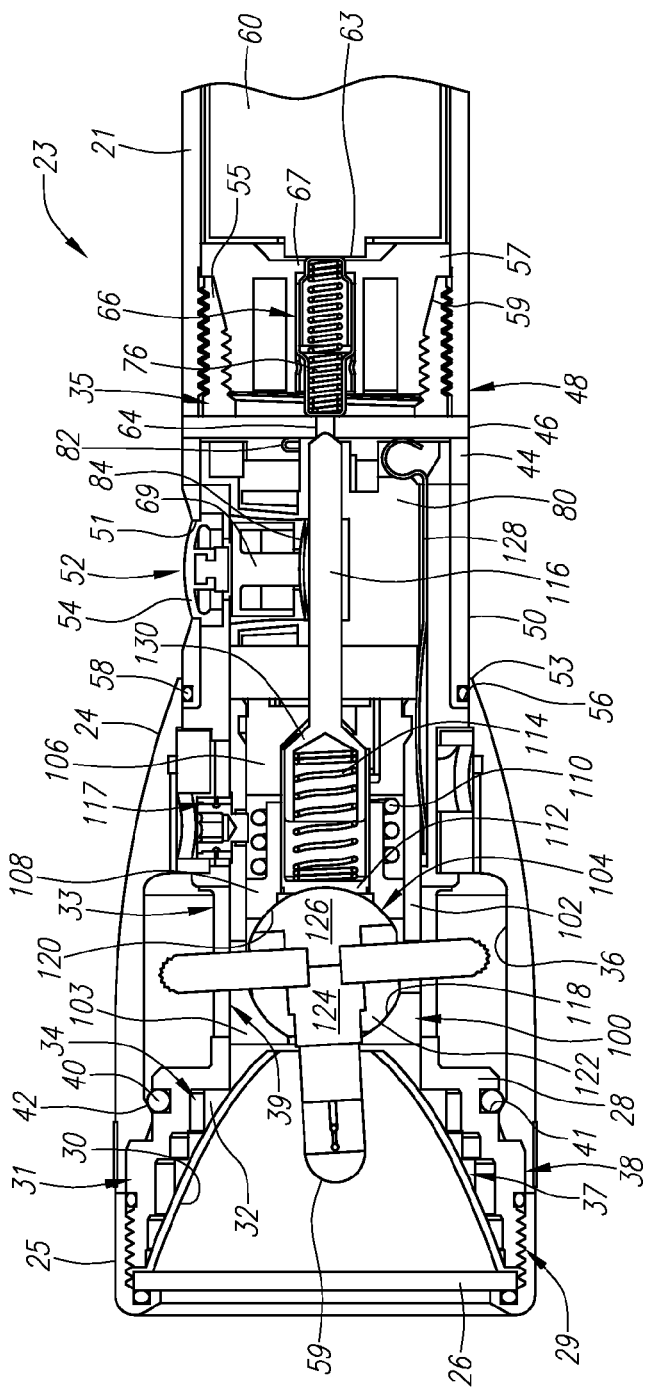

CIRCUITRY FOR PORTABLE LIGHTING DEVICES AND PORTABLE RECHARGEABLE ELECTRONIC DEVICES

CROSS REFERENCE TO RELATED APPLICATIONS

This is a continuation of prior co-pending U.S. patent application Ser. No. 11/351,307, filed Feb. 8, 2006, which is in turn a continuation-in-part of prior U.S. patent application Ser. No. 11/007,771, now issued U.S. Pat. No. 7,579,782, filed Dec. 7, 2004.

BACKGROUND OF THE INVENTION

1. Field of the Invention

The field of the present invention relates to portable electronic devices, including hand held portable lighting devices, such as flashlights, and their circuitry.

2. Background

Various hand held or portable lighting devices, including flashlight designs, are known in the art. Flashlights typically include one or more dry cell batteries having positive and negative electrodes. In certain designs, the batteries are arranged in series in a battery compartment of a barrel or housing that can be used to hold the flashlight. An electrical circuit is frequently established from a battery electrode through conductive means which are electrically coupled with an electrode of a lamp bulb. After passing through the lamp bulb, the electric circuit continues through a second electrode of the lamp bulb in electrical contact with conductive means, which in turn are in electrical contact with the other electrode of a battery. Incandescent lamp bulbs include a bulb filament. Typically, the circuit includes a switch to open or close the circuit. Actuation of the switch to close the electrical circuit enables current to pass through the lamp bulb and through the filament, in the case of an incandescent lamp bulb, thereby generating light.

Traditional flashlights use a mechanical switch to "turn on" the flashlight. This is achieved by mechanically connecting two contacts and allowing current to flow from the positive terminal of the batteries, through the lamp, and back to the negative terminal of the batteries. One of the disadvantages of a mechanical switch is that they are prone to wear and tear as well as oxidation of the elements that physically make and break the circuit. Mechanical switches also do not permit automated or regulated modes of activating and deactivating a flashlight.

Another disadvantage of traditional flashlights is that when they are switched on they instantly allow large amounts of current to flow from the batteries through the lamp filament, thereby stressing the filament. This surge of current occurs because the resistance of the lamp's filament is very low when the filament is cold.

Essentially a lamp filament is a piece of wire that initially acts as a short circuit. The filament resistance builds as the filament heats until the point where light is emitted. Consequently, when the flashlight is initially turned on, a significantly greater amount of current than the bulb is designed to handle flows through the lamp. Although the current surge during this transient stage exceeds the bulb's design limits, the duration of the transient stage is short enough that bulbs generally survive the current surge. Over time, however, this rush of current causes damage to the lamp by stressing the filament and ultimately failure of the lamp filament. Indeed, it is generally during this transient stage that a lamp filament will ultimately fail.

Yet another disadvantage of traditional flashlights is that they are generally powered with alkaline or dry cell batteries. Alkaline or dry cell batteries, when exhausted, are discarded and users have to buy new ones to replace the depleted ones. Replacing batteries is an inconvenience and an additional expense to a flashlight user. Furthermore, alkaline or dry cell batteries are heavy, thereby adding to the overall weight of the flashlight.

Rechargeable lead-acid batteries were developed to replace alkaline and dry batteries. These types of batteries have the advantages of being rechargeable and dischargeable for repeated use. They are, however, relatively large and must be refilled with liquid electrolyte after being used for a period of time. Due to their bulky size and weight, even heavier than alkaline/dry cell batteries, rechargeable lead-acid batteries are usually used with wall-mounted safety lighting fixtures, motorcycles, and automobiles, but are generally not considered suitable for use with portable lighting devices, such as flashlights.

Nickel-cadmium batteries and nickel-metal hydride batteries have been used to replace conventional batteries in flashlights. Nickel-cadmium and nickel-metal hydride batteries have the advantages of being light in weight, convenient for use, and repeatedly rechargeable and dischargeable. However, these batteries have a disadvantage of causing heavy metal pollution. Moreover, the nickel-cadmium and nickel-metal hydride batteries have the so-called battery memory effect. Thus, in order to avoid shortening the life of the batteries, it is necessary to discharge any unused power of these types of batteries before they can be recharged.

An improved rechargeable energy source for portable electronic devices is the lithium-ion battery. Lithium-ion batteries have a higher energy density and a lower self-discharge rate than nickel-cadmium and nickel-metal hydride batteries. Lithium-ion batteries also have a higher energy to weight ratio than nickel-cadmium and nickel-metal hydride batteries. However, a lithium-ion battery can explode if it is charged beyond its safe limits, or if its terminals are shorted together. Further, over discharging a lithium-ion battery can permanently damage the lithium-ion cell. Accordingly, most lithium-ion batteries are made available in a battery pack that includes a built-in protection circuit that has over charge, over discharge, and short circuit protection capabilities. This battery pack protection circuit internally blocks current from flowing from the lithium-ion battery pack when a short is detected. Thus, if there is a short across the recharging contacts for the device, the battery pack protection circuit trips and the electronic device will cease to operate To avoid such inadvertent interruptions, recharging contacts of portable electronic devices that are powered by a rechargeable lithium-ion batty pack have the contacts in hard to reach or hidden locations. Unfortunately, such a configuration requires the use of plugs, special inserts, alignment tabs or a complex cradle to recharge the batteries. Obstructing access to the recharging contacts is not, however, a viable solution in the case of flashlights or other rechargeable devices where design requirements dictate that the charging contacts or rings be exposed.

If rechargeable lithium-ion batteries were used in a flashlight with exposed charge rings and the user accidentally created a short across the exposed charge contacts with a metal object such as his or her car keys, the lamp would go off until the metal object creating the short circuit is removed. Such inadvertent interruptions may be dangerous when a user is working in an unlit area, especially for law enforcement and emergency response personnel. And, while a simple diode can be placed in the recharging circuit to prevent accidental short circuits from being created across the charging rings or contacts for other rechargeable battery chemistries, such as nickel-cadmium and nickel metal hydride, this solution is not viable for lithium-ion battery packs. A simple diode cannot be used in these circumstances because the forward voltage drop of a diode varies greatly while charging lithium-ion batteries requires very tight control over the termination voltage.

In view of the foregoing, rechargeable lithium-ion battery technology has not been adopted for use in portable electronic devices with exposed charging contacts, such as rechargeable flashlights. A need, therefore, exists for a means of providing improved short circuit protection in rechargeable devices, such as flashlights, having exposed charging contacts. A separate need also exists for a flashlight with improved circuitry that ameliorates one or more of the problems discussed above.

SUMMARY OF THE INVENTION

It is an object of the present invention to address or at least ameliorate one or more of the problems associated with the flashlights and/or rechargeable devices noted above.

Accordingly, in a first aspect of the invention, a portable rechargeable electronic device, such as a flashlight, with external charging contacts and a short protection circuit is provided. The short protection circuit electrically uncouples one of the exposed charging contacts from the rechargeable power supply for the device when the charging contacts are shorted together. The charging contact is uncoupled without opening the power circuit for the device; thus, the device can continue to operate while the charging contacts are shorted. The power supply for the device may be a rechargeable lithium-ion battery pack.

According to one embodiment, the rechargeable electronic device comprises a main power circuit including a DC power source and a power consuming load, a first charging contact electrically coupled to a first electrode of the power source via a first electrical path, a second charging contact electrically coupled to a second electrode of the power source via a second electrical path, and a short protection circuit configured to open the first electrical path at a location that is not within the main power circuit if the first charging contact and the second charging contact are shorted together.

The short protection circuit preferably includes a switch interposed in the first electrical path between the first charging contact and the first electrode at a location that is not within the main power circuit. The short protection circuit may be configured to open the switch if the first and second charging contacts are shorted together. The switch may, for example, be a transistor, including either a field effect transistor or a bipolar transistor. Preferably the switch is a p-channel metal-oxide-semiconductor field effect transistor (MOSFET).

The short protection circuit may also include a comparing device adapted to compare a voltage of a first input signal to a voltage of a second input signal and open or close the switch based on the comparison. The voltage of the first signal may be proportional to the voltage difference between the first charging contact and ground and the voltage of the second signal may be proportional to the voltage of the power source. The comparing device may, for example, comprise a comparator, an op amp, an ASIC, or a processor. When the voltage drop between the first charging contact and ground is approximately equal to or greater than the voltage of the battery, the switch is commanded to be in the "on" position by the comparing device. As a result, when the device is in its charger energy may flow from the charging contact to the power source. When the voltage drop between the first charging contact and ground is zero, the switch is commanded to be in the "off" position. Thus, if a short occurs between the charging contacts, the switch will be turned "off" or opened. As a result, the power source avoids any short across the charging contacts and can continue to supply power to the power consuming load.

The rechargeable device may comprise a flashlight, and the DC power source may comprise a rechargeable lithium-ion battery pack. In case of a short across the charging contacts, the short protection circuit may be configured to detect and clear the short faster than the built-in short circuit protection of the lithium-ion battery pack. As such, the short protection circuit ensures that the operation of the device is not interrupted if a short occurs on the external charging contacts. This is particularly advantageous if the rechargeable device comprises a flashlight.

In yet a further embodiment, a rechargeable flashlight is provided that comprises a power source, a lamp electrically coupled to the power source through a main power circuit, a first charging contact electrically coupled to a first electrode of the power source through a first electrical path, a second charging contact electrically coupled to a second electrode of the power source through a second electrical path, and a logic circuit controlling a switch interposed in the first electrical path at a location that is not within the main power circuit. The logic circuit is configured to signal the switch to open if the first and second charging contacts are shorted together.

According to a second aspect of the invention, a portable lighting device that includes a circuit for regulating current flow through the lamp of the device is provided. The circuit preferably reduces the initial surge of current that is sent through the lamp when the lamp is turned on. In the case of lighting devices that employ incandescent lamp bulbs, such a circuit may be used to reduce the stresses placed on the lamp bulb when the lighting device is turned on, thereby extending the life expectancy of the lamp bulb.

According to one embodiment, the lighting device comprises a main power circuit including a power source, a light source, and an electronic power switch, and a power control circuit. The power control circuit is electrically coupled to the electronic power switch and adapted to regulate current flow through the electronic power switch in response to a control signal. The power control circuit may regulate the electronic power switch when the lighting device is turned on to limit the peak current that flows through the main power circuit prior to the main power circuit reaching a steady state. The electronic power switch may comprise a transistor, and the light source may include a filament. Preferably the electronic power switch comprises an n-channel MOSFET and the power control circuit applies the modified control signal to the gate of the MOSFET. The lighting device may comprise a flashlight.

In a preferred embodiment, the lighting device further comprises a microprocessor and a mechanical switch for opening and closing an electrical path between the power source and the microprocessor. The microprocessor provides the control signal to the power control circuit in response to an activation signal received from the mechanical switch, and the power control circuit modifies the control signal and applies the modified control signal to the electronic power switch. The voltage of the control signal may vary according to a step function when the lighting device is turned on, while the modified control signal may have a voltage that increases over time after the lighting device is turned on. Preferably the voltage of the modified control signal increases exponentially after the flashlight is turned on.

According to another embodiment, the lighting device comprises a flashlight having a main power circuit that includes a power source, a lamp, and an electronic power switch, and a power control circuit electrically coupled to the electronic power switch and adapted to provide a signal to the electronic power switch while the flashlight is on. In the present embodiment, the amount of current the electronic power switch is capable of conducting in the main power circuit is dependent on the voltage of the signal applied to the electronic power switch, and the power control circuit is configured to vary the voltage of the signal in a manner that increases the amount of current that can flow through the power switch over a predetermined period when the flashlight is turned on.

Preferably the predetermined period is set to be greater than the time required for the main power circuit to reach a steady state after the flashlight is turned on. If the lamp includes a filament, the predetermined period is preferably greater than the thermal time constant of the filament. Typically, the predetermined period will be 10 milliseconds or more, and more preferably the predetermined period will be 40 milliseconds or more.

In one implementation, the power control circuit varies the voltage of the signal according to an exponential function, preferably an increasing exponential function. Preferably the time constant of the exponential function is determined by the values of a resistor and a capacitor included in the power control circuit.

The electronic power switch may comprise a transistor, such as a field effect transistor or a bipolar transistor. Preferably, the electronic power switch comprises a MOSFET. If the electronic power switch comprises a field effect transistor, the signal is applied to the gate of the transistor.

The flashlight may further comprise a microprocessor and a mechanical switch for opening and closing an electrical path between the power source and the microprocessor. The microprocessor provides a control signal to the power control circuit in response to an activation signal received from the mechanical switch, and the power control circuit modifies the control signal to produce the signal applied to the electronic power switch. The voltage of the control signal preferably varies according to a step function when the flashlight is turned on, while the signal applied to the electronic power switch preferably increases over time according to an exponential function.

In another aspect of the present invention, the flashlight operates in a duty cycle of less than 11% in the "on" mode.

In another separate aspect of the present invention it is contemplated that elements of the aforementioned aspects of the present invention may be combined.

Further aspects, objects, desirable features, and advantages of the invention will be better understood from the following description considered in connection with accompanying drawings in which various embodiments of the disclosed invention are illustrated by way of example. It is to be expressly understood, however, that the drawings are for the purpose of illustration only and are not intended as a definition of the limits of the invention.

BRIEF DESCRIPTION OF THE DRAWINGS

FIG. 2 is a cross-sectional view of the flashlight of FIG. 1 taken through the plane indicated by 2-2.

FIG. 3 is an enlarged cross-sectional view of the forward section of the flashlight of FIG. 1 taken through the plane indicated by 2-2.

FIG. 11A is an oscilloscope trace showing current flow over time in the main power circuit of a flashlight equipped with a power control circuit according to the present invention when the flashlight is initially turned on.

FIG. 11B is an oscilloscope trace showing current flow over time in the main power circuit of a flashlight without a power control circuit according to the present invention when the flashlight is initially turned on.

DETAILED DESCRIPTION OF PREFERRED EMBODIMENTS

Figure 1:
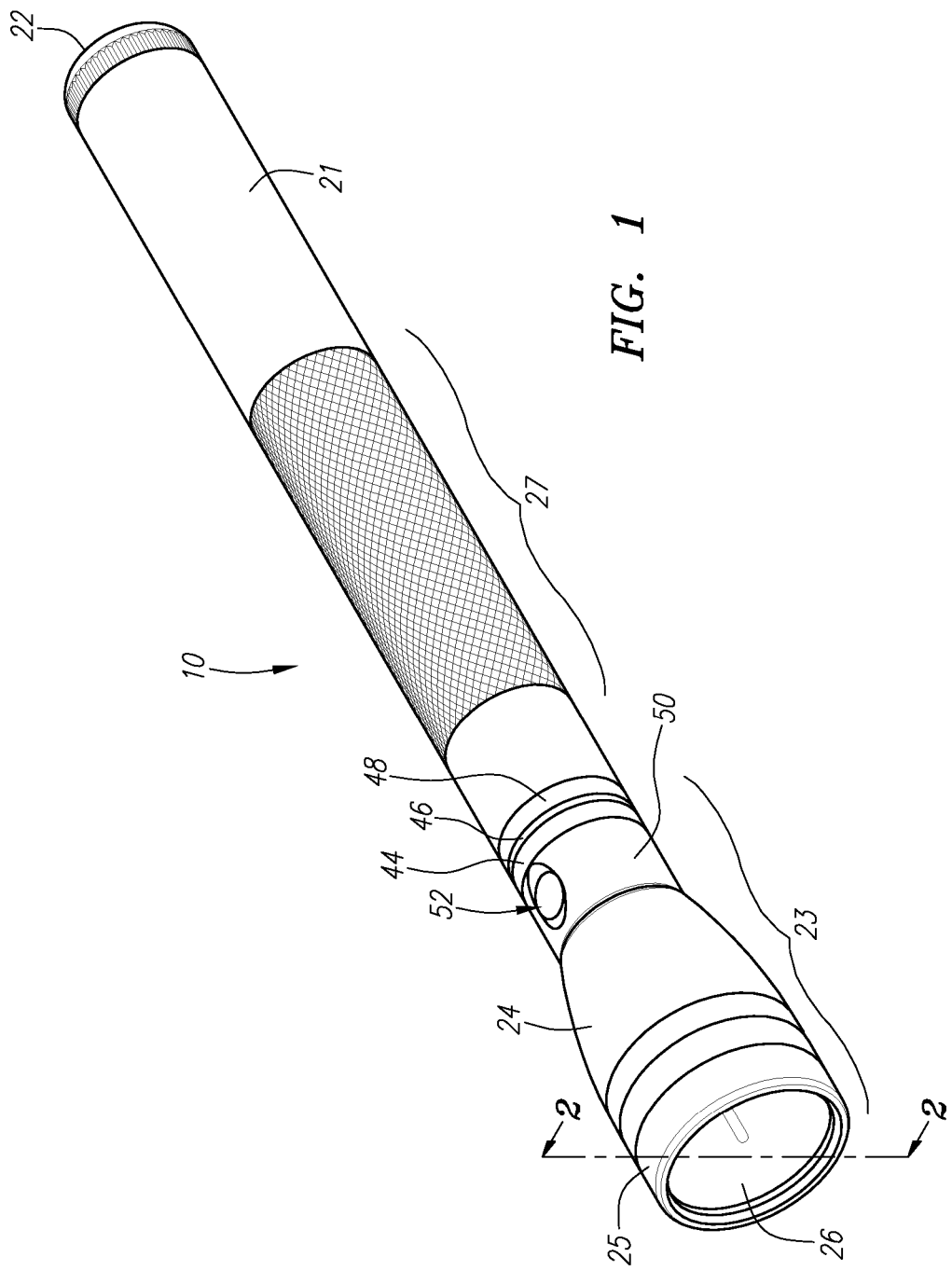
FIG. 1 is a perspective view of a flashlight according to one embodiment of the present invention.

To facilitate the description of the invention, any reference numeral representing an element in one figure will represent the same element in any other figure.

A flashlight 10 according to one embodiment of the present invention is illustrated in perspective in FIG. 1. The flashlight 10 incorporates a number of distinct aspects of the present invention. While these distinct aspects have all been incorporated into the flashlight 10, it is to be expressly understood that the present invention is not restricted to flashlight 10 described herein. Rather, the present invention is directed to each of the inventive features of the flashlight described below individually as well as collectively. Further, as will become apparent to those skilled in the art after reviewing the present disclosure, one or more aspects of the present invention may also be incorporated into other electronic devices, including cell phones, portable radios, toys, as well as other non-portable lighting devices.

Referring to FIGS. 1-4, flashlight 10 includes a barrel 21 enclosed at a rearward end by a tail cap 22 and at a forward end by a head and switch assembly 23.

Barrel 21 is preferably made out of aluminum. As is known in the art, barrel 21 may be provided with a textured surface 27 along its axial extent, preferably in the form of machined knurling.

In the present embodiment, barrel 21 is configured to enclose a rechargeable lithium-ion battery pack 60. Battery pack 60 may comprise one or more lithium-ion battery cells. Preferably battery pack 60 comprises at least two lithium-ion cells disposed physically in a series or end to end arrangement, while being electrically connected in parallel. In other embodiments, it may be desirable to electrically connect the two cells in series. Further, barrel 21 may also be configured to include a battery pack 60 comprising two or more lithium-ion batteries or cells physically disposed in a parallel or side-by-side arrangement, while being electrically connected in series or parallel depending on the design requirements of the flashlight. Furthermore, while a lithium-ion battery pack 60 is used as the power source for the illustrated embodiment of flashlight 10, in other embodiments of the present invention, other DC power sources may be employed, including, for example, dry cell batteries as well as other types of rechargeable batteries.

Figure 5:
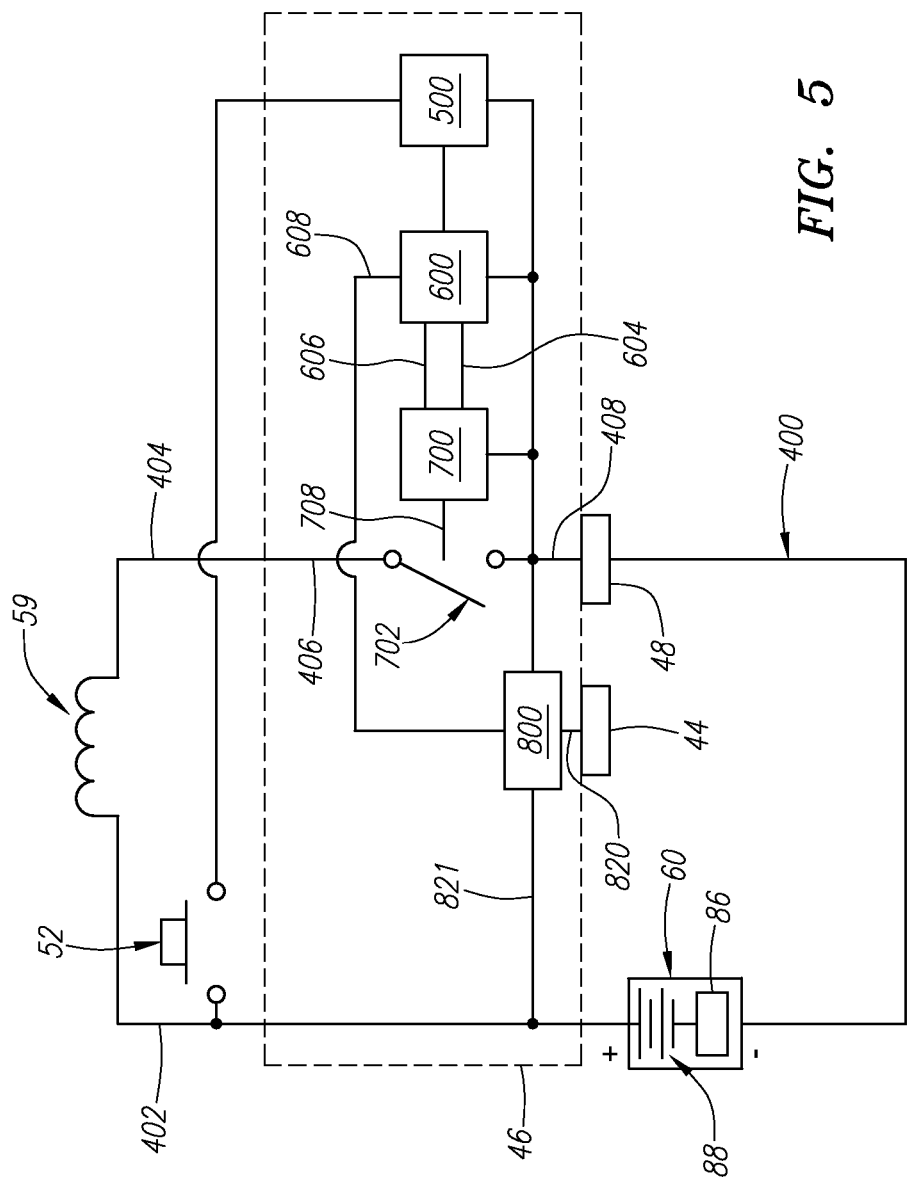
FIG. 5 is a circuit diagram for the flashlight of FIG. 1 illustrating the relationship of the electronic circuitry according to one embodiment of the invention.

The rechargeable lithium-ion battery pack 60 preferably includes built-in short circuit protection circuitry 86, as best seen in FIG. 5. Battery packs of this type are readily available in the market from such providers as BYD Company Limited and will interrupt the flow of current from the battery pack if the electrodes of the battery back are shorted together.

Tail cap 22 is also preferably made out of aluminum and is configured to engage mating threads provided on the interior of barrel 21 as is conventional in the art. However, other suitable means may also be employed for attaching tail cap 22 to barrel 21. As best seen in FIG. 2, a one-way valve 68, such as a lip seal, may be provided at the interface between the tail cap 22 and barrel 21 to provide a watertight seal. However, as those skilled in the art will appreciate, other forms of sealing elements, such as an O-ring, may be used instead of one-way valve 68 to form a watertight seal. One way valve 68 is retained in a circumferential channel 70 formed in tail cap 22. Further one-way valve 68 is oriented so as to prevent flow from outside into the interior of the flashlight 10, while simultaneously allowing overpressure within the flashlight to escape or vent to atmosphere.

The design and use of one-way valves in flashlights is more fully described in U.S. Pat. No. 5,113,326 to Anthony Maglica, which is hereby incorporated by reference.

If made out of aluminum, the surfaces of barrel 21 and tail cap 22 are preferably anodized with the exception of those surfaces used to make electrical contact with another metal surface for purposes of forming the electrical circuit of the flashlight. In the present embodiment, an electrical path is formed between barrel 21 and the case electrode 61 of the lithium-ion battery pack 60 by conductive member 72 and spring 74. In addition to forming part of the electrical path between the barrel and case electrode, spring 74 also urges battery pack 60 forward so that the center electrode 63 of battery pack 60 is urged into one end of spring biased conductor 76, which is held by and extends through retaining bolt 57.

The head and switch assembly 23 of the present embodiment includes a support structure 28 to which a number of other components may be mounted, including, for example, head 24, face cap 25, charging contact 44, printed circuit board 46, sleeve 50, switch 52, and moveable lamp assembly 100. For ease of manufacturing, support structure 28 is preferably made out of injection molded plastic. Head 24, face cap 25, and sleeve 50, on the other hand, are preferably made from anodized aluminum.

In the present embodiment, support structure 28 is a hollow support structure comprising a front section 31, a midsection 33 and an aft section 35. The front section 31 comprises a generally cup-shaped receiving area 37. The midsection 33, which extends rearward from the front section 31, includes a generally cylindrical inner surface 39. And, the aft section 35, which extends rearward from the midsection 33, includes two opposing arcuate threaded fingers 55 (only one of which is visible in the cross-sections of FIGS. 2-4).

The face cap 25 retains lens 26 and reflector 30 relative to the support structure 28. In the present embodiment face cap 25 is configured to thread onto external threads 29 provided on the front section 31 of the support structure 28. In other implementations, however, other forms of attachment may be adopted. As illustrated, reflector 30 is positioned within the cup-shaped receiving area 37 of the front section 31 of support structure 28. Corresponding alignment features 32, 34 may be provided on the outer surface of reflector 30 and the internal mating surface of support structure 28, respectively, to ensure proper alignment between the reflector 30 and support structure 28.

Head 24 has a diameter greater than that of the barrel 21 and sleeve 50. Head 24 is also adapted to pass externally over the exterior of the barrel 21 and sleeve 50. Internal surface 36 of head 24 is configured to mate with the outer surface 38 of support structure 28 at select locations to properly position head 24 relative to face cap 25 and support structure 28. A compressible retaining ring 40, such as a rubber O-ring, may be seated in a channel 41 extending around the outer surface 38 of support structure 28 to create an interference fit between the support structure 28 and a feature provided on the internal surface 36 of head 24, such as circumferential lip 42. Compressible retaining ring 40 also prevents moisture and dirt from entering the head assembly between the support structure 28 and forward end of head 24.

External charging contacts 44 and 48 are provided at the forward section of flashlight 10. While charging contacts 44 and 48 are provided in the present embodiment in the form of charging rings to simplify the recharging procedure, in other embodiments contacts 44 and 48 may take on other forms. In the present embodiment, printed circuit board 46 is interposed between charging contacts 44 and 48. Printed circuit board 46 is configured to be in electrical communication with charging contacts 44 and 48, while simultaneously isolating charging contacts 44, 48 from direct electrical communication with one another through a short circuit. Electrical communication between printed circuit board 46 and charging contacts 44, 48 may be established by providing a conductive trace at the interface formed between printed circuit board 46 and each of the charging contacts.

External charging contact 44 is preferably an aluminum ring disposed on the external surface 38 of support structure 28, preferably toward the aft end of the mid-section 33. If barrel 21 is made out of anodized aluminum, external charging contact 48 may be integrally formed in barrel 21 by machining a portion of the barrel to remove any anodizing from the location of charging contact 48 or by masking the location of charging contact 48 prior to anodizing the barrel 21. In the present embodiment, charging contact 48 is located at the forward end of barrel 21.

As noted above, the head and switch assembly 23 also preferably includes a sleeve 50. Sleeve 50 is disposed over the external surface 38 of the support structure 28 so that it extends forward from the charging contact 44 to a position that is under the trailing edge 53 of head 24. Sleeve 50 is preferably made out of anodized aluminum, but may also be made out of other metals or plastics. As a result of the foregoing construction, with the exception of the external surface formed by printed circuit board 48 and switch 52, all of the external surfaces of the flashlight 10 according to the present embodiment may be made out of metal, and more preferably aluminum.

Figure 4:
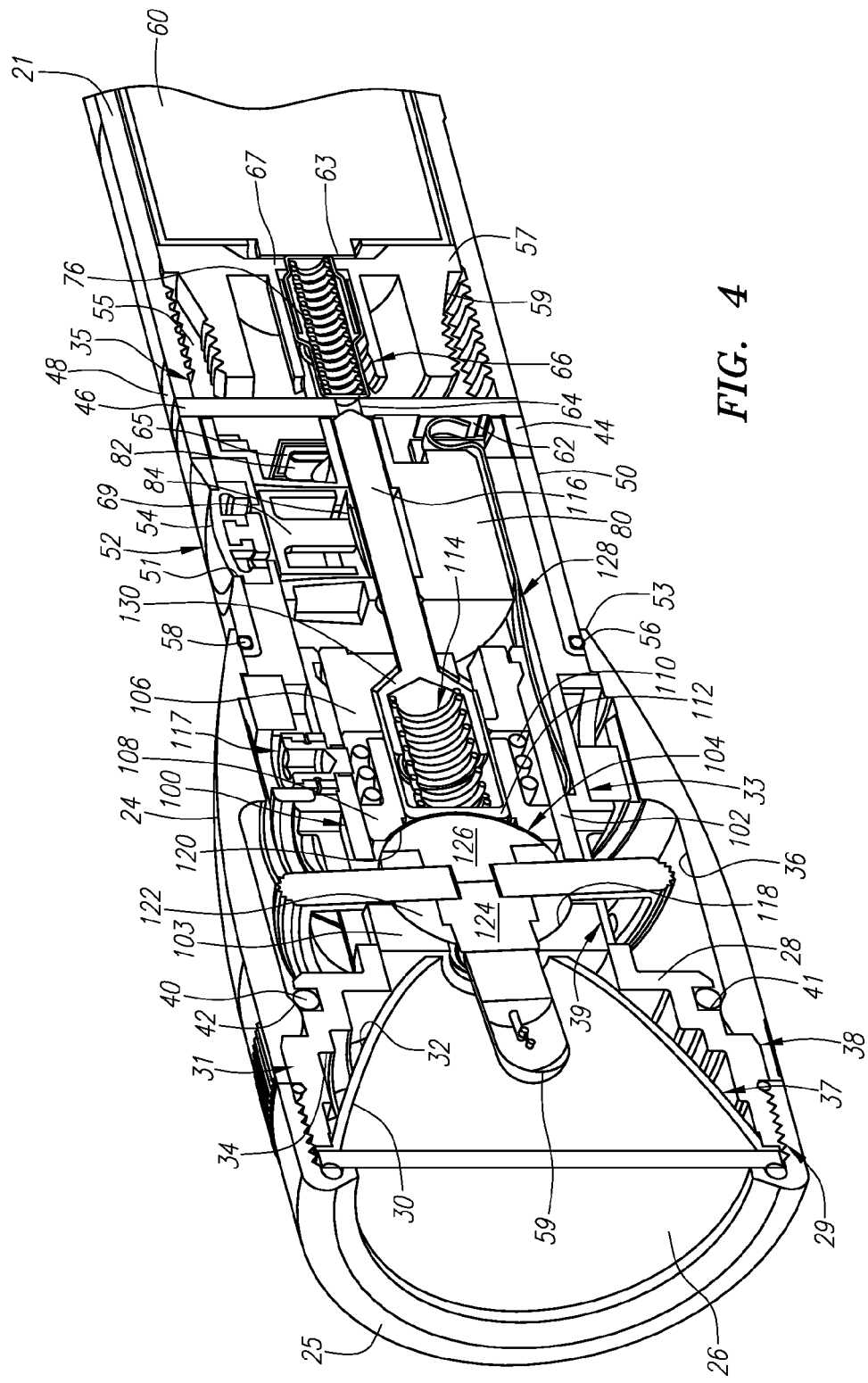
FIG. 4 is a perspective view of the cross-sectional view shown in FIG. 3.

Sleeve 50 is provided with a hole 51 through which switch cover 54 of switch 52 extends. The outer surface of sleeve 50 surrounding switch cover 54 may be beveled to facilitate tactile operation of flashlight 10. Sleeve 50 may also be provided with a groove 56 about its circumference at a location forward of the trailing edge 53 of head 24 for positioning a sealing element 58, such as an O-ring, to form a watertight seal between the head 24 and sleeve 50. Similarly, switch cover 54 is preferably made from molded rubber or latex. As best illustrated in FIGS. 3 and 4, switch cover 54 is preferably configured to prevent moisture and dirt from entering the head and switch assembly 23 through hole 51.

In the present embodiment, lamp 59 is removeably mounted within the head and switch assembly 23 so as to extend into reflector 30 through a central hole provided therein. In particular, lamp 59 is mounted on moveable lamp assembly 100, which in turn is slideably mounted within the mid-section 33 of support structure 28.

While lamp 59 may be any suitable device that generates light, in the present embodiment lamp 59 is preferably an incandescent lamp bulb, and more preferably a bi-pin incandescent lamp bulb. In other implementations of the invention, however, lamp 59 may comprise, for example, an LED lamp or an arc lamp.

In the present embodiment, moveable lamp assembly 100 includes an adjustable ball housing 102, a ball-shaped adjustable bulb holder 104, an end cap 106, a retainer 108, retention spring 110, a spring biased conductor 112, spring 114, conductor post 116 and cam follower assembly 117.

As seen in FIGS. 3 and 4, lamp 59 is held by the ball-shaped adjustable bulb holder 104. The ball-shaped adjustable bulb holder 104 is in turn adjustably mounted within adjustable ball housing 102. In this regard, adjustable ball housing 102 is partially enclosed at its forward end by wall 103. Wall 103 includes a concave mating surface 118 against which ball-shaped bulb holder 104 is adjustably retained. Retainer 108, which is adapted to slide within adjustable ball housing 102, includes a concave surface 120 designed to slideably mate with the opposite side of ball-shaped adjustable bulb holder 104. End cap 106 encloses the aft end of adjustable ball housing 102 and is mounted in a fixed relationship thereto. Retention spring 104 is interposed between the fixed end cap 106 and the slideable retainer 108, thereby biasing retainer 108 toward the forward end of the flashlight until concave surface 120 engages ball-shaped adjustable bulb holder 104. As a result, ball-shaped adjustable bulb holder 104 is adjustably held between concave surface 118 of wall 103 and concave surface 120 of retainer 108.

Ball-shaped adjustable bulb holder 104 includes a metal portion 122, a first contact holder 124, and a second contact holder 126. In the present embodiment, the metal portion 122 comprises a zone of a sphere with a through hole. First contact holder 124 and second contact holder 126 are made from a non-conductive material, such as plastic, and are configured to create an interference fit within the through hole of metal portion 122. The second contact holder 126 includes a head portion shaped like a sector of a sphere so that in combination with the metal portion 122 the ball-shaped adjustable bulb holder 104 is provided with a substantially spherical outer surface.

The electrodes of lamp 59 extend into the first contact holder 122 where they preferably frictionally engage with positive and negative electrode contacts, respectively (not shown). One of the electrode contacts, the negative in the present embodiment, is configured to extend between the mating surfaces of the first and second contact holders 124, 126 and make electrical connection with the metal portion 122 of ball-shaped adjustable bulb holder 104. The other electrode contact, the positive in the present embodiment, extends through both the first and second contact holders 124, 126 and includes a surface for mating with the spring biased conductor 112.

The construction of moveable lamp assembly 100 is described in detail in connection with FIGS. 6-18 of pending U.S. patent application Ser. No. 10/802,265, filed Mar. 16, 2004, which is hereby incorporated by reference.

The metal portion 122 of ball-shaped adjustable bulb holder 104 is in electrical communication with adjustable ball housing 102, which is also preferably made out of metal. Adjustable ball housing 102 is in turn in electrical communication with leaf spring conductor 128, a portion of which is in slideable contact with the exterior of adjustable ball housing 102. Leaf spring conductor 128 is also in electrical communication with printed circuit board 46 at contact pad 62 on printed circuit board 46.

Contact post 116 extends through end cap 106 and switch housing 80. Contact post 116 is frictionally held by switch housing 80 so that its aft end is in electrical communication with printed circuit board 46 at via 64. Via 64 extends through the center of printed circuit board 46 in the present embodiment. At its forward end, contact post 116 is slideably supported within the through hole provided in end cap 106. A cup-shaped portion 130 provided on the forward end of contact post 116 is configured to hold one end of spring 114 while the other end of spring 114 forces spring biased conductor 112 into contact with an exposed portion of the electrode contact extending through the second contact holder 126 of ball-shaped adjustable bulb holder 104. Spring biased conductor 112 is also cup-shaped in the present embodiment and has a diameter slightly greater than that of cup-shaped portion 130 so that it can slideably fit over the exterior surface of the cup-shaped portion 130 and hold spring 114 therebetween.

The head and switch assembly 23 is attached to barrel 21 by way of the two arcuate threaded fingers 55 forming the aft section 35 of support structure 28. The two arcuate threaded fingers 55 extend through printed circuit board 46. The arcuate threaded fingers 55 are provided with both external and internal threads. The external threads mate with corresponding internal threads provided within the forward end of barrel 21. Once the head and switch assembly 23 is threaded into the barrel 21, retaining bolt 57 is threaded into the internal threads of the arcuate threaded fingers 55. Preferably the retaining bolt 57 includes a tapered shaft 59 configured to spread the arcuate threaded fingers 55, thereby locking the head and switch assembly 23 to the barrel.

Spring biased conductor 76 is compressibly held within central cavity 66 of retaining bolt 57 between printed circuit board 46 and end wall 67. Spring biased conductor 76 also electrically couples via 64 on printed circuit board 46 to center electrode 63 of rechargeable lithium-ion battery pack 60.

FIG. 5 is a circuit diagram for flashlight 10 and schematically represents a preferred embodiment of the electronic circuitry according to the present invention. As shown in FIG. 5, flashlight 10 includes a main power circuit 400, a switch 52, a debounce circuit 500, a microprocessor control circuit 600, a power control circuit 700, charging contacts 44, 48, and a short protection circuit 800. In the present embodiment, debounce circuit 500, microprocessor control circuit 600, power control circuit 700, and short protection circuit 800 are all formed on printed circuit board 46. In other implementations, however, other arrangements are possible.

Main power circuit 400 of the present embodiment comprises, rechargeable lithium-ion battery pack 60, electrical path 402, lamp 59, electrical path 404, and electronic power switch 702.

As best seen in FIG. 5, rechargeable lithium-ion battery pack 60 includes built in short circuit protection circuitry 86. The built in short circuit protection circuitry 86 is disposed in series with lithium-ion cell 88 within lithium-ion battery pack 60. In the illustrated embodiment, the short circuit protection circuitry is disposed between the negative electrode of lithium-ion cell 88 and the negative electrode of battery pack 60. Built-in short circuit protection circuitry 86 could, however, also be provided between the positive electrode of lithium-ion cell 88 and the positive electrode of battery pack 60.

Electrical path 402 connects the center electrode 63 of rechargeable lithium-ion battery pack 60 to the positive electrode of lamp 59. In the flashlight illustrated in FIGS. 1-4, electrical path 402 comprises the following elements: spring biased conductor 76, via 64, conductor post 116, spring 114, spring biased conductor 112, and the positive electrode contact disposed within ball-shaped adjustable bulb holder 104.

Electrical path 402 connects the negative electrode of lamp 59 to the case electrode 61 of the rechargeable lithium-ion battery pack. Further, electrical path 404 is opened and closed to complete and break the main power circuit 400 by electronic power switch 702, which is described in more detail below. In the flashlight illustrated in FIGS. 1-4, electrical path 404 comprises: the negative electrode contact disposed within ball-shaped adjustable bulb holder 104, the metal portion 122 of ball-shaped adjustable bulb holder 104, adjustable ball housing 102, leaf spring conductor 128, contact pad 62, conductive trace 406, electronic power switch 702, conductive trace 408, barrel 21, conductive member 72 in tail cap 22, and spring 74.

While electronic power switch 702 is located on printed circuit board 46 in the present embodiment, electronic power switch 702 may also be located in other places within flashlight 10.

Electronic power switch 702 is electrically coupled to contact pad 62 via conductive trace 406, which is also provided on printed circuit board 46. Electronic power switch 702 is also electrically coupled to barrel 21 via conductive trace 408, which extends on printed circuit board 46 from electronic power switch 702 to the interface between printed circuit board 46 and barrel 21.

It is noted that other than electronic power switch 702, the constituent members of electrical paths 402, 404 are not critical to the operation of power circuit 400 according to the present aspect of the invention and any combination of members as may be appropriate for forming the electrical paths of a power circuit for a particular flashlight design may be employed.

Electronic power switch 702 selectively opens and closes the electrical path 404 between the lamp 59 and case electrode 61 of the rechargeable lithium-ion battery pack 60. When electronic power switch 702 is closed, current is permitted to flow through main power circuit 400.

The opening and closing of electronic power switch 702 is controlled, in the present embodiment, by switch 52, microcontroller circuit 600 and power control circuit 700.

Manipulation of switch 52 generates a signal which determines whether electronic power switch 702 opens or closes, or repeatedly opens and closes in a manner hereinafter described.

In the present embodiment, switch 52 is a momentary switch. When switch 52 is depressed, plunger 69 of switch 52 pushes snap dome 84 of conductor 82 into electrical communication with conductor post 116. A signal from battery pack 60 is then transmitted to printed circuit board 46 through contact pad 65. When this signal is transmitted to printed circuit board 46, electronic power switch 702 may be signaled to open or close the electrical path 404, thereby permitting flashlight 10 to be turned on or off accordingly.

Unlike mechanical switches known in the art, switch 52 does not conduct current to the lamp 59. Instead, switch 52 merely provides an activation or deactivation signal. In the present embodiment, this activation or deactivation signal is sent to microcontroller circuit 600, which in turn signals electronic power switch 702 through power control circuit 700 to open or close accordingly. The main power circuit 400 in the present embodiment is thus indirectly activated or deactivated by the manipulation of switch 52 by a user.

Because the current from rechargeable lithium-ion battery pack 60 to the lamp 59 passes through electronic power switch 702, and not switch 52, switch 52 may be designed to operate under very low current.

In the illustrated embodiment shown in FIG. 5, switch 52, debounce circuit 500, microcontroller circuit 600, power control circuit 700, and electronic power switch 702 are all in electrical communication. When switch 52 is initially depressed, a signal is sent to the microcontroller circuit 600 through the debounce circuit 500. The microcontroller circuit 600 in response sends a signal through the power control circuit 700 to the electronic power switch 702. In response, the electronic power switch 702 permits current to flow to lamp 59 from the lithium-ion battery pack 60 at a controlled increasing rate over a predetermined period. A more detailed description of debounce circuit 500, microcontroller circuit 600, power control circuit 700, and electronic power switch 702 are discussed below in connection with FIGS. 6, 7, and 8.

Figure 6:
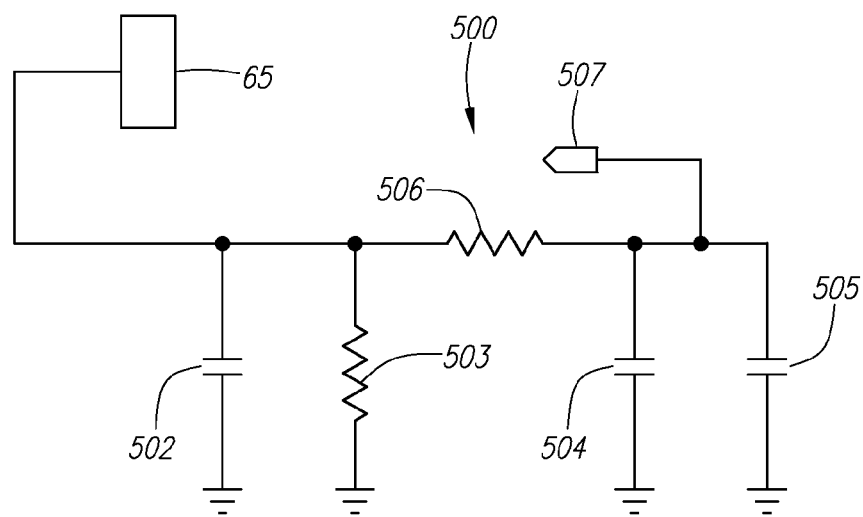
FIG. 6 is a circuit diagram of one embodiment of a debounce circuit for a momentary switch that may be employed in a flashlight according to the present invention.

FIG. 6 is a detailed schematic of one embodiment of a debounce circuit 500 that may be employed in the present invention. Debounce circuit 500 may be used to reduce the noise, current, and voltage of the signal sent from switch 52 to the microcontroller circuit 600.

A signal to turn lamp 59 on or off enters the debounce circuit 500 through contact pad 65 when a user manipulates switch 52 in a manner so as to cause plunger 69 to force snap dome 84 into contact with conductor post 116. As a result of this manipulation, a signal is sent via contact pad 65 through debounce circuit 500. The output of the debounce circuit 500 is provided at output 507, which is in electrical communication with microcontroller circuit 600 illustrated in FIG. 7.

In one embodiment of debounce circuit 500, capacitors 502, 504, 505, and resistor 503 are coupled in parallel to contact pad 65 and output 507, while resistor 506 is serially interposed between contact pad 65 and output 57, preferably down stream of the parallel branches for capacitor 502 and resistor 503.

Those skilled in the art will know how to design a debounce circuit 500 to achieve a suitable signal level to microcontroller circuit 600. In the design illustrated in FIG. 6, however, it has been found that resistor 506 may have a resistance of 10 KΩ, resistor 503 may have a resistance of 1 KΩ and capacitors 502, 504, and 505 may each have a capacitance of 0.1 μF.

Figure 7:
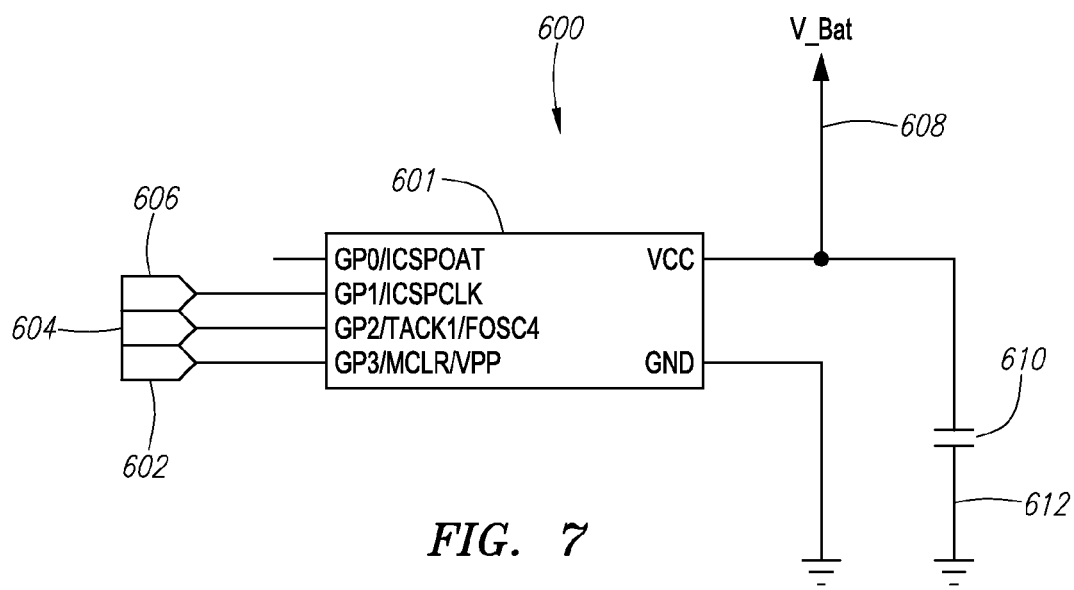
FIG. 7 is a circuit diagram of one embodiment of a microcontroller that may be employed in a flashlight according to present invention.

FIG. 7 is a schematic diagram of microcontroller circuit 600. In the present embodiment, microcontroller circuit 600 includes a microcontroller 601 having an input 602 and two outputs 604, 606. Further, the GND pin of microcontroller 601 is directly connected to ground, and the Vcc pin of the microcontroller 601 is electrically connected to battery pack 60 via conductive trace 608 and to ground through capacitor 610 via conductive trace 612. The signal provided on trace 608 may also be a battery signal that has been filtered by a diode, although such filtering is unnecessary. If such filtering is performed, it may be performed in the short protection circuit 800 as described below.

A signal from output 507 of the debounce circuit 500 enters microcontroller 601 through input pin 602. Microcontroller 601 may be programmed to provide for different user selectable functions, the selection of which may be controlled by the nature of the input signal received on input pin 602. Thus, for example, if flashlight 10 is in the off state and switch 52 is depressed and released, microcontroller 601 may be programmed to provide a signal on output pin 606 that will turn flashlight 10 on. Microcontroller 601 may further be programmed so that the flashlight 10 will stay on with a second depression of switch 52 until the second release of switch 52. Other functions may also be programmed into microcontroller 601. For example, microcontroller 601 may be programmed such that a user may select a power reduction mode by depressing switch 52 and holding it down for two seconds or a strobe mode by depressing switch 52 and holding for 4 seconds. Other functional modes that can be performed by microcontroller 601 may include a beacon function mode and an automatic off mode.

If flashlight 10 is in the off state, microcontroller 601 will send a control signal out through output pin 606 in response to a signal received through input pin 602. The control signal from output pin 606 is provided to input 707 of power control circuit 700 where it is modified in a desired manner before being supplied over trace 708 to electronic power switch 702 so that electronic power switch 702 is gradually closed in response to the control signal, thereby limiting the initial in-rush of current through lamp 59.

In connection with other operational modes programmed into microcontroller 601, it may be desirable to modify the control signal produced by microcontroller 601 in an alternative manner. Accordingly, in the illustrated embodiment, microcontroller 601 also includes a second output 604 for providing a second control signal to power control circuit 700. A control signal from output pin 604 is provided to input 709 of power control circuit 700. The control signal from output pin 604 is modified within power control circuit 700 before being provided on trace 708 to electronic power switch 702 so that power switch 702 is closed at a different rate in response to a control signal provided on output pin 604 of microcontroller 601.

FIG. 7 is a schematic diagram of power control circuit 700, which is coupled to electronic power switch 702 via conductive trace 708. An electronic power switch 702 is selected that permits different levels of current to flow through main power circuit 400 in response to different signal levels provided at trace 708. In the present embodiment, electronic power switch 702 comprises an n-channel MOSFET 705. The gate of the MOSFET is electrically connected to trace 708, the drain to the center electrode 63 of battery pack 60 through input 703, and the source to ground (e.g., the case electrode 61 of battery pack 60). An n-channel MOSFET works well in the present invention due to its transfer characteristics, namely that the drain current is zero (i.e., the electronic power switch 702 is open) when the gate-to-source voltage is below approximately 0.75 Volts.

While the present embodiment employs an n-channel MOSFET 705, it will become apparent to those skilled in the art from the present disclosure that other types of electronic power switches may also be employed in the present invention. For example, a p-channel MOSFET could be used in place of the re-channel MOSFET if electronic power switch 702 were provided on the high-side of main power circuit 400 (i.e., prior to lamp 59). Similarly, other types of transistors may also be employed for electronic power switch 702, including other field effect transistors, such as JFETs and DE MOSFETs, and bipolar junction transistors.

As noted above, power control circuit 700 modifies the control signals received from output pins 604, 606 of microcontroller 601. In particular, power control circuit 700 is designed to modify the control signals so that they vary over time based on the transfer characteristics of the employed electronic power switch 702 and the rate at which electronic power switch 702 is to be closed. Preferably, power circuit 700 modifies at least one of the control signals received from microcontroller 601 so that when the control signal reaches electronic power switch 702, electronic power switch 702 is gradually closed over time, as opposed to being closed instantaneously.

When flashlight 10 is in the off state, the signals at inputs 707 and 709 are both high impedance signals so they are effectively not part of power control circuit 700. Further, the value of resistor 703 is selected so that when flashlight 10 is in the off state, resistor 703 pulls the gate voltage of MOSFET 705 to zero volts (through resistor 701) so that electronic power switch 702 is open.

The degree to which electronic power switch 702 is closed and hence the amount of current permitted to flow in main power circuit 400 is ultimately controlled in the illustrated embodiment by the voltage across capacitor 710, which also correspond to the gate-to-source voltage of MOSFET 705. When a control signal is provided on inputs 707 or 709, the voltage across capacitor 710 will increase exponentially according to the equation $V_c=E(1-e^{-t/\tau})$ until the maximum voltage of the control signal is achieved. In the foregoing equation, E is the voltage of the control signal applied to input 707 or 709 and $\tau$ is the time constant for the circuit and is determined by the equation $\tau=RC$. Further, while it takes a period of approximately $5\tau$ before a capacitor is fully charged, during a period of $1\tau$ the voltage across capacitor 710 will reach approximately 63% of the voltage of the applied control signal from microcontroller 601. Thus, by appropriately selecting R and C for each of the circuit paths corresponding to inputs 707 and 709, the rate at which the gate-to-source voltage increases, and hence how quickly the electronic power switch 702 is closed, after a control signal is provided from microcontroller 601, may be controlled.

As noted above, when flashlight 10 is initially turned on, a control signal is provided from output pin 606 of microcontroller 601 to input 707 of power control circuit 700. As a result, the signal at input 707 goes from high impedance to, for example, a 3 Volt signal instantaneously. The voltage across capacitor 710, and hence the gate-to-source voltage will, however, increase exponentially to 3 Volts according to the formula given above. By gradually increasing the voltage of the control signal to reach electronic power switch 702 over trace 708 in the foregoing manner, the current permitted to flow to lamp 59 may be increased at a controlled rate. In turn, by increasing the amount of current sent to lamp 59 at a controlled rate, lamp 59 may be permitted to achieve its steady state resistance at a controlled, reduced rate, thereby protecting lamp 59 from the normal large initial surge of current from battery pack 60 when the flashlight is turned on.

In a preferred embodiment, resistor 701 has a resistance of 470 KΩ, resistor 703 has a resistance of 1 KΩ and capacitor 710 has a capacitance of 0.1 μF. This combination of resistor 701 and capacitor 703 forms a low pass filter with a time constant of 47 ms (470,000×0.000001=0.047 seconds or 47 milliseconds). During this period capacitor 710 will be charged to approximately 63% of the voltage of the control signal provided on input 707 (or 0.63*5 Volts=3.15 Volts). This means that it will take approximately 47 ms for the gate-to-source voltage of MOSFET 705 to pass from the off region, through the current limited region, to the linear region of the transistor. During this time, the filament of lamp 59 is heated while limiting the in-rush of current to a more desirable level.

As noted above, a control signal provided on output 604 of microcontroller 601 may be provided to input 709 for purposes of closing electronic power switch 702 at a different rate than that achieved by a control signal provided at input 707. For example, resistor 704 may be set at 1.0 KΩ, while capacitor 710 is still set at a capacitance of 0.1 μF. This combination results in a low pass filter circuit with a time constant of 0.0001 seconds (0.1 ms). Thus, under this configuration, capacitor 710 will be charged to approximately 63% of the voltage of the control signal provided at input 709 (or 3.15 Volts in the present embodiment) in 0.1 ms.

Accordingly, a control signal provided on input 709 of power control circuit 700 may be used to close and open electronic power switch 702 at much higher frequency than a control signal provided on input 707. This feature may be desirable for certain user selectable functions, such as a power reduction mode. For example, if a user selects a power reduction mode by depressing switch 52 for an appropriate duration, the microcontroller 601 may send out an initial control signal from output pin 606 to input 707 to energize lamp 59 relatively slowly as described above. After the lamp 59 has already been turned on and the filament has been heated so that it is at or near its steady state resistance, microcontroller 601 may send out a square wave pulse modulated control signal, such as the one shown in FIG. 13, from output pin 604 to input 709 of power control circuit 700 and stop sending out a control signal on output 606.

Based on a time constant of 0.1 ms, the pulse modulated signal sent out from output pin 604 of microcontroller 601 could be modulated at a rate between approximately 5 kHz and 100 Hz, and still be at a frequency that is much higher than the visible flicker rate of 60 Hz. Further, due to the short cycle time between each pulse, the filament of lamp 59 will not cool sufficiently between cycles so as to result in undue stress by the high frequency of the on, off cycles. As a result, flashlight 10 may be operated in a manner that will permit lamp 59 to, for example, operate at half power and thus consume half the energy it would normally consume over a given period of time.

Although the power control circuit of the present embodiment has been described as employing an RC circuit to modify the control signal provided to electronic power switch 702, other forms of circuits with time constants, such as RL and RLC circuits, may be employed in power control circuit 700 as well. In addition, circuits that produce linear, sinusoidal, saw tooth, or triangular waveforms may also be used for power control circuit 700. Further, the benefits of power control circuit 700 may be realized in a flashlight in which the control signal delivered to the power control circuit comes directly from a mechanical switch as opposed to a microcontroller or in which any form of DC power source is substituted for battery pack 60.

Figure 10A:
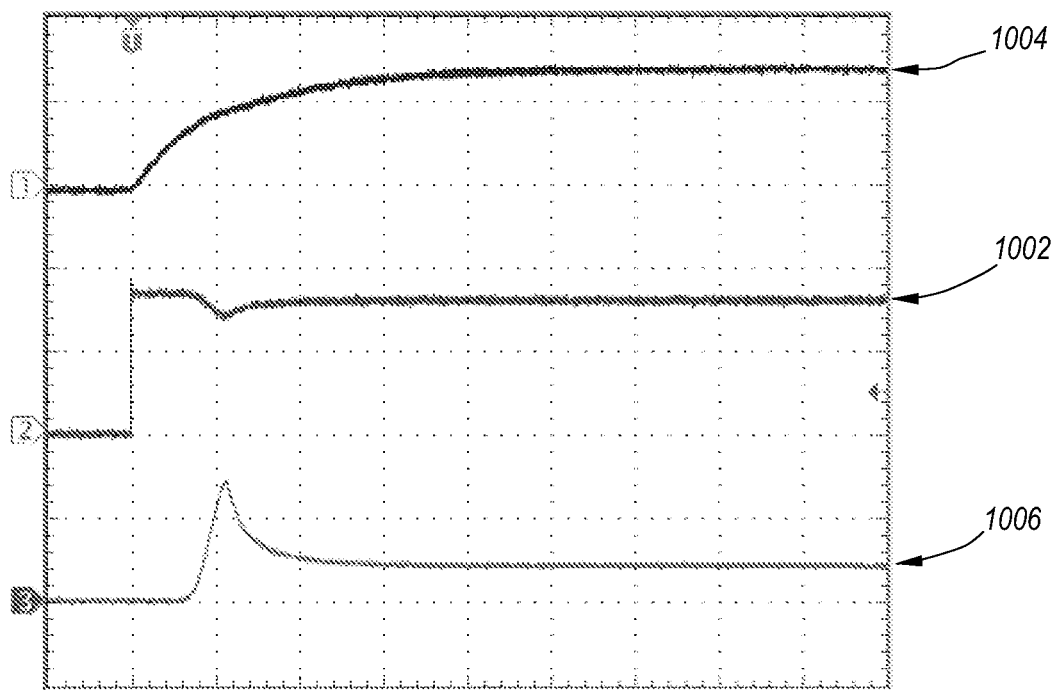
FIG. 10A shows three oscilloscope traces reflecting (1) how the voltage of a control signal from the microcontroller of the flashlight shown in FIG. 1 may vary over time when the flashlight is initially turned on, (2) how the voltage of a signal from the power control circuit varies in response to the control signal of the microcontroller, and (3) how the current supplied to the lamp of the flashlight varies in response to the signal from the power control circuit.

FIG. 10A graphically demonstrates the beneficial dampening effects that power control circuit 700 may provide to lamp 59 when flashlight 10 is initially turned on. In contrast, FIG. 10B graphically demonstrates that the rate of change of current flow and the peak current flow through electronic power switch 702 is much greater when a power control circuit 700 according to the present invention is not controlling the signal to electronic power switch 702.

FIG. 10A shows three oscilloscope traces 1002, 1004, 1006. The oscilloscope traces of FIG. 10A were obtained from a flashlight having a power control circuit 700 as described above in connection with FIG. 8 to drive an electronic power switch 702 comprising a MOSFET 705. Further, the resistor 701 had a value of 470 KΩ and the capacitor 710 had a value of 0.1 μF. The time constant for the power control circuit was thus 47 ms.

Figure 10B:
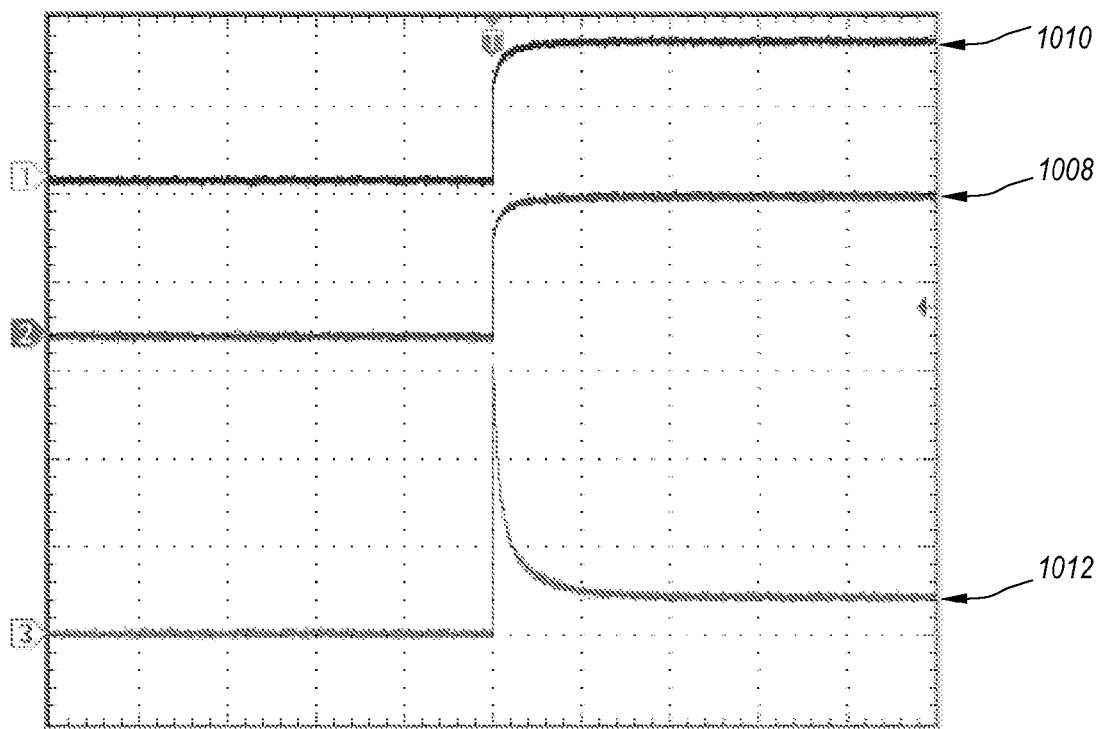
FIG. 10B shows three oscilloscope traces for a flashlight without a power control circuit according to the present invention, but was otherwise the same as the flashlight used to obtain the oscilloscope traces shown in FIG. 10A. The three traces shown in FIG. 10B reflect (1) how the voltage of a control signal from a microcontroller of a flashlight without a power control circuit may vary over time when the flashlight is initially turned on, (2) how the gate-to-source voltage of the electronic power switch will vary in response to the voltage of the control signal, and (3) how the current supplied to the lamp of the flashlight varies in response to the voltage applied to the electronic power switch.

The oscilloscope traces of FIG. 10B were obtained at a time when the flashlight went from the off state to the on state and respectively reflect (1) how the voltage of the control signal from the microcontroller 601 of the flashlight varied over time when the flashlight was initially turned on, (2) how the voltage of the signal from the power control circuit 700, and hence the gate-to-source voltage of MOSFET 705, varied in response to the control signal of the microcontroller, and (3) how the current that traveled through MOSFET 705, and hence supplied to the lamp 59 of the flashlight, varied in response to the signal from the power control circuit.

The x-axis of FIG. 10A represents time in milliseconds, and the distance between each of the vertical grid lines crossing the x-axis represents 40 milliseconds. The y-axis of FIG. 10A, on the other hand, represents different units or values depending on which signal or curve is being referenced.

In FIG. 10A, trace 1002 is an oscilloscope trace of the voltage of the control signal output from microcontroller 601 when the flashlight 10 was initially turned on. The spacing between each of the grid lines crossing the y-axis for trace 1002 represent 2 Volts. As illustrated in the graph, the voltage of control signal 1002 basically corresponded to a step wave. Hence, the voltage of the control signal went from a low condition of 0 Volts to a high condition of 3 Volts when flashlight 10 was turned on.

Trace 1004 is an oscilloscope trace of the voltage of the control signal output from microcontroller 601 after it passed through power control circuit 700 via input 707. Thus, it corresponds to the gate-to-source voltage of MOSFET 705. As with signal 1002, the spacing between each of the grid lines crossing the y-axis represents 2 Volts for trace 1004. The voltage of this modified control signal exhibits an exponential growth function as discussed above. This exponential increase in the voltage of the signal sent to electronic power switch 702 closed power switch 702 at a controlled rate. Hence, the rate of change of current flow and the peak current flow through MOSFET 705 and lamp 59 was reduced. This can be seen by comparing trace 1006 to corresponding trace 1012 shown in FIG. 10B, both of which are discussed below.

Figure 11A:
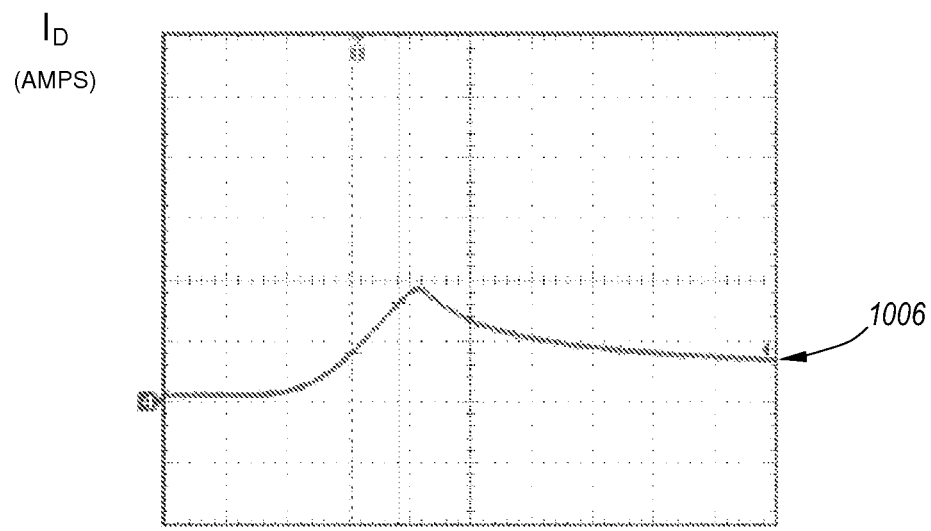

Trace 1006 of FIG. 10A is an oscilloscope trace of the current flow through MOSFET 705, and hence lamp 59, that resulted from the gate-to-source voltage being controlled in the manner illustrated by trace 1004. The spacing between each of the grid lines crossing the y-axis represents 2 Amps for trace 1006. FIG. 11A shows trace 1006, but at an increased time scale. The time scale used in FIG. 11A is ten times greater than that used in FIG. 10A; thus, the space between each of the vertical grid lines in FIG. 11A represents 4 milliseconds. The current scale on the y-axis for FIG. 11A, on the other hand, is the same as that for trace 1006 in FIG. 10A.

The peak current that was permitted to flow through lamp 59 when the flashlight 10 was turned on was determined to be 3.75 Amps in this example of the present invention. The peak current may be determined from curve 1006 shown in FIGS. 10A and 11A by measuring the height of the current peak in curve 1006 relative to its baseline. Because FIG. 11A shows current flow through MOSFET 705 at a time scale greater than that shown in FIG. 10A, however, a more accurate measurement of the peak current can be made from FIG. 11A.

FIG. 10B shows three oscilloscope traces 1008, 1010, 1012. The flashlight used to obtain the traces of FIG. 10B. was the same as the flashlight used to obtain the oscilloscope traces shown in FIG. 10A, except that it was modified so that the control signal from microprocessor 601 was fed directly into the gate of MOSFET 705, thus bypassing the power control circuit according to the present invention. As with FIG. 10A, the oscilloscope traces shown in FIG. 10B were taken at a time when the flashlight went from the off state to the on state and respectively reflect (1) how the voltage of the control signal from the microcontroller of the flashlight varied over time when the flashlight was initially turned on and the control signal was fed directly into the gate of MOSFET 705, thus bypassing the power control circuit 700, (2) how the gate-to-source voltage of MOSFET 705 varied in response to the voltage of the control signal under such circumstances, and (3) how the current that flowed through the electronic power switch, and hence supplied to the lamp of the flashlight, varied in response to the voltage applied to the gate of electronic power switch.

The x-axis of FIG. 10B represents time in milliseconds, and the distance between each of the vertical grid lines crossing the x-axis represents 40 milliseconds. The x-axis, therefore, employs the same scale as used in FIG. 10A. The y-axis of FIG. 10B, like the y-axis of FIG. 10A, represents different units or values depending on which signal or curve is being referenced.

In FIG. 10B, trace 1008 is an oscilloscope trace of the voltage of the control signal output from microcontroller 601 when the flashlight was initially turned on. The spacing between each of the grid lines crossing the y-axis for trace 1002 represent 2 Volts like in FIG. 10A. As demonstrated in the graph, the voltage of control signal 1002 basically corresponds to a step wave. Hence, the voltage of the control signal went from a low condition of 0 Volts to a high condition of 3 Volts when flashlight 10 was turned on. Notably, however, the leading edge of control signal 1008 is slightly rounded. This is the result of the large in-rush of current that occurred through lamp 59 of the comparative example at the instant the flashlight was turned on. This in-rush of current effectively lowered the voltage of the battery pack momentarily. A similar dip in the voltage of the control signal is observed in curve 1002. However, in curve 1002, the dip is displaced from the leading edge of the control signal and it is not as large. This is because the peak current flow through lamp 59 is delayed and reduced in the flashlight employing a power control circuit 700 according to the present invention.

Trace 1010 is an oscilloscope trace of the gate-to-source voltage of MOSFET 705. As with signal 1008, the spacing between each of the grid lines crossing the y-axis represents 2 Volts. In the present comparative example, the gate-to-source voltage is the same as the voltage of the control signal 1008 provided by the microcontroller because the power control circuit for the flashlight was bypassed. As a result of there being no power control circuit 700 interposed between microcontroller 601 and electronic power switch 702, power switch 702 was instantaneously driven from a state of non-conduction to a location on the transfer characteristics curve of MOSFET 705 that would permit significantly more current to flow through MOSFET 705 than actually flows through main power circuit 400. In other words, the rate of change of current flow and the peak current flow through main power circuit 400 was not limited by power switch 702 while transitioning the flashlight from the off state to the on state. This in turn resulted in the large in-rush of current to lamp 59 and the large current spike observed in trace 1012 of FIG. 10B.

Figure 11B:
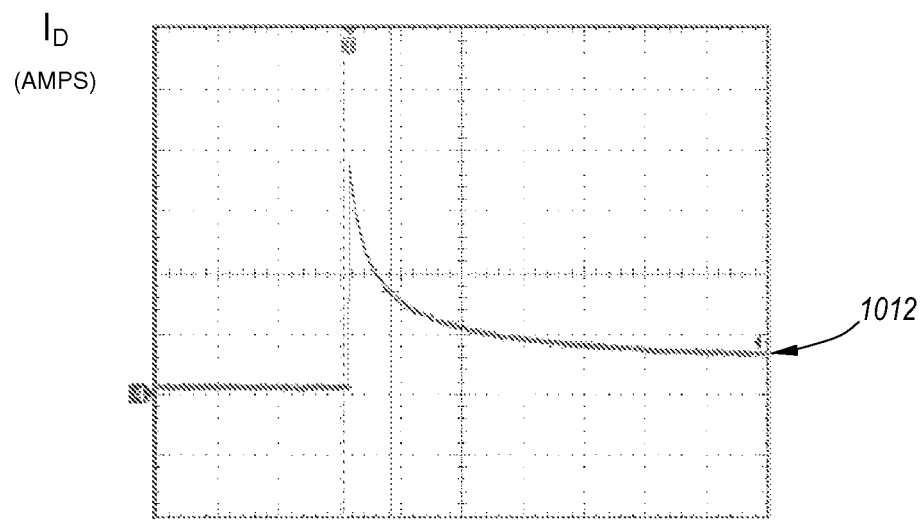

Trace 1012 of FIG. 10B is an oscilloscope trace of the current flow through MOSFET 705, and hence lamp 59, versus time when the gate-to-source voltage is not controlled by a power control circuit. The spacing between each of the grid lines crossing the y-axis represents 2 Amps for trace 1012. FIG. 11B shows trace 1012, but at an increased time scale. The time scale used in FIG. 11B is ten times greater than that used in FIG. 10B; thus, the space between each of the vertical grid lines in FIG. 11B represents 4 milliseconds and FIG. 11B is on the same time scale as FIG. 11A. The current scale on the y-axis for FIG. 11B, on the other hand, is the same as that for trace 1012 in FIG. 10B as well as that for trace 1006 in FIG. 11A.

The peak current flow through MOSFET 705 and lamp 59 for this comparison example was approximately 7.8 Amps. A comparison of curve 1006 in FIGS. 10A and 11A to curve 1012 in FIGS. 10B and 11B thus shows that the peak current delivered to the lamp 59 was reduced by approximately 4.05 Amps, or by slightly more than 50%, when the power control circuit 700 according to the above described example of the invention was employed to control the rate at which electronic power switch 702 was closed. A comparison of curves 1006 and 1012 also shows that that the current peak in curve 1006 is much broader and softer than the current peak in curve 1012. This results from the fact that the rate of change of current flow through electronic power switch 702 may be markedly reduced in flashlights employing a power control circuit 700 according to the present invention.

It is to be recognized that the current curve 1006 shown in FIGS. 10A and 11A is merely one example of how current to lamp 59 may be controlled. Indeed, if a power control circuit 700 with different time constants or characteristics, an electronic power switch 702 with different transfer characteristics, or a lamp having different characteristics is employed, a different curve may result, thus effecting the amount of the dampening effect achieved.

Figure 12:
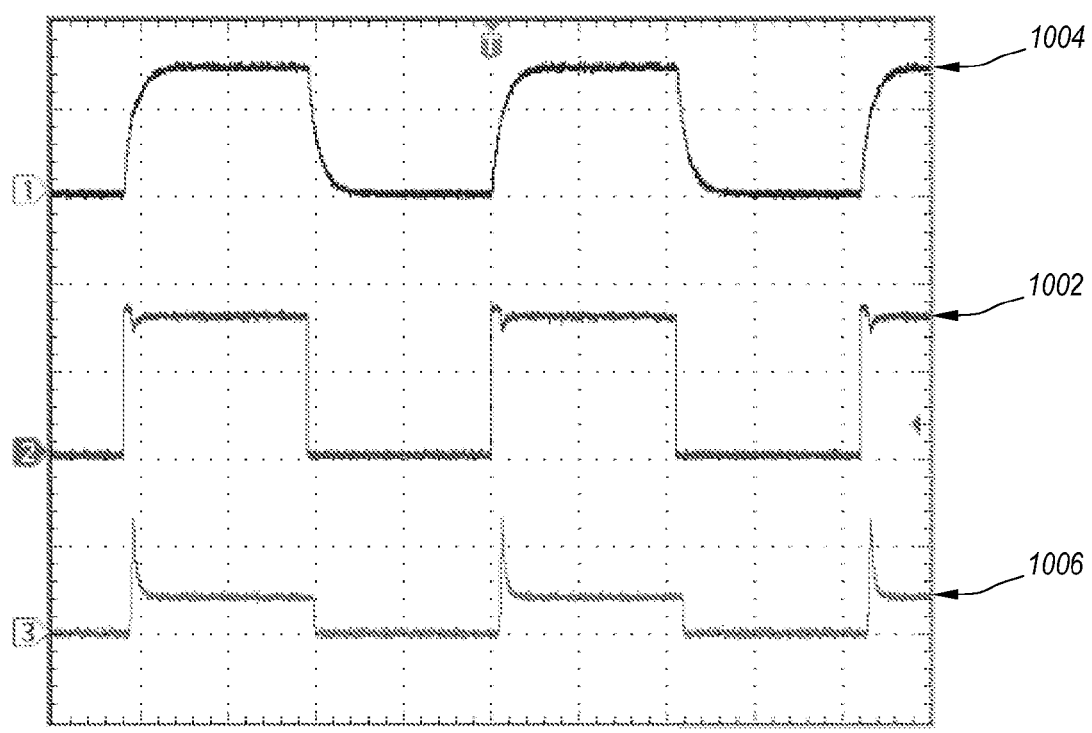
FIG. 12 shows three oscilloscope traces for a flashlight according to the present invention that was operated in a strobe mode. The three traces reflect: (1) the voltage of the control signal from the microprocessor, (2) the voltage of the modified control signal generated by the power control circuit, and (3) the current flow through the electronic power switch.

The oscilloscope traces of FIG. 12 were obtained from the same flashlight used to obtain FIG. 10A. The flashlight, however, was being operated in the strobe mode when the oscilloscope traces 1002, 1004, and 1006 of FIG. 12 were recorded. The strobe mode was selected by holding switch 52 down for approximately 4 seconds, thus providing microprocessor 601 an activation signal for the strobe mode.

As with FIG. 10A, traces 1002, 1004, and 1006 of FIG. 12 correspond, respectively, to the voltage of the control signal from output pin 606 of microprocessor 601, the voltage of the modified control signal generated by the power control circuit 700, and the current through MOSFET 705. The y-axis scale for each of curves 1002, 1004, and 1006 corresponds to the y-axis scale for the corresponding curves of FIG. 10A. However, the scale of the x-axis in FIG. 12 is one-tenth the scale that was used in FIG. 10A; thus, the spacing between each of the vertical gridlines in FIG. 12 corresponds to 400 milliseconds. A reduced scale was used so that a series of strobe cycles could be observed.

As shown in FIG. 12, the voltage of the control signal 1002 was modulated according to a square wave during strobe mode operation. Each cycle of the square wave equaled approximately 1.6 seconds. During one half of the cycle, the voltage of the control signal was approximately 3.6 Volts, while during the other half the cycle the voltage of the control signal was 0 Volts. The 800 milliseconds between each on cycle, was much greater than the time required for the filament of lamp 59 to cool, and again act like a short circuit when initially powered.

Trace 1004 is an oscilloscope trace of the voltage of the control signal output from microcontroller 601 after it had passed through power control circuit 700 via input 707, and thus corresponds to the gate-to-source voltage of MOSFET 705. The voltage of this modified control signal exhibits an exponential growth function at the leading edge of each pulse and an exponential decay function at the trailing edge of each pulse. The exponential growth function is due to the 47 ms time constant of the RC circuit formed by the resistor 701 and capacitor 710 combination. The exponential decay function will also have a time constant of approximately 47 ms, because resistor 703 is only 1 KΩ.

Because the voltage of the signal 1004 provided to electronic power switch 702 increased exponentially at the leading edge of each pulse in the same manner as signal 1004 in FIG. 10A increased, power switch 702 was closed at the same controlled rate described above in connection with FIG. 10A. Indeed, if the time scale of FIG. 12 were to be increased to that used in FIG. 10A or 11A, the leading edge of each current pulse shown in trace 1006 of FIG. 12 would look the same as the leading edge of the current pulses in traces 1006 of those figures. The rate of change of current flow and the peak current flow through MOSFET 705 and lamp 59 were, therefore, reduced each time the lamp was powered during the strobe mode, thus reducing the stresses placed on the filament of lamp 59 each time the lamp was powered during a cycle. This was so even though the filament cooled during the "off" portion of each cycle to a temperature that again made the filament behave like a short circuit.

Because the stresses placed on the filament of the lamp are reduced each time the lamp is powered in a flashlight having a power control circuit according to the present invention, the lamp will have an extended life expectancy. This is particularly beneficial when the flashlight is operated in a strobe mode where the stresses placed on the lamp filament quickly accumulate with each pulsing of the lamp.

It can be seen from FIG. 12 that current continues to flow through lamp 59 even after control signal 1002 has switched from a high state to a low state. This is because the trailing edge of each pulse in trace 1004 exhibits an exponential decay function. Thus, electronic power switch 702 will continue to conduct current until the voltage of the modified control signal drops below a level sufficient to permit MOSFET 705 to conduct. Because the time constant of the decay path for power circuit 700 was approximately 47 ms in the present example, MOSFET 705 continued to conduct current for approximately 40 to 50 ms after each time the control signal 1002 went from the high state to the low state.

Figure 13:
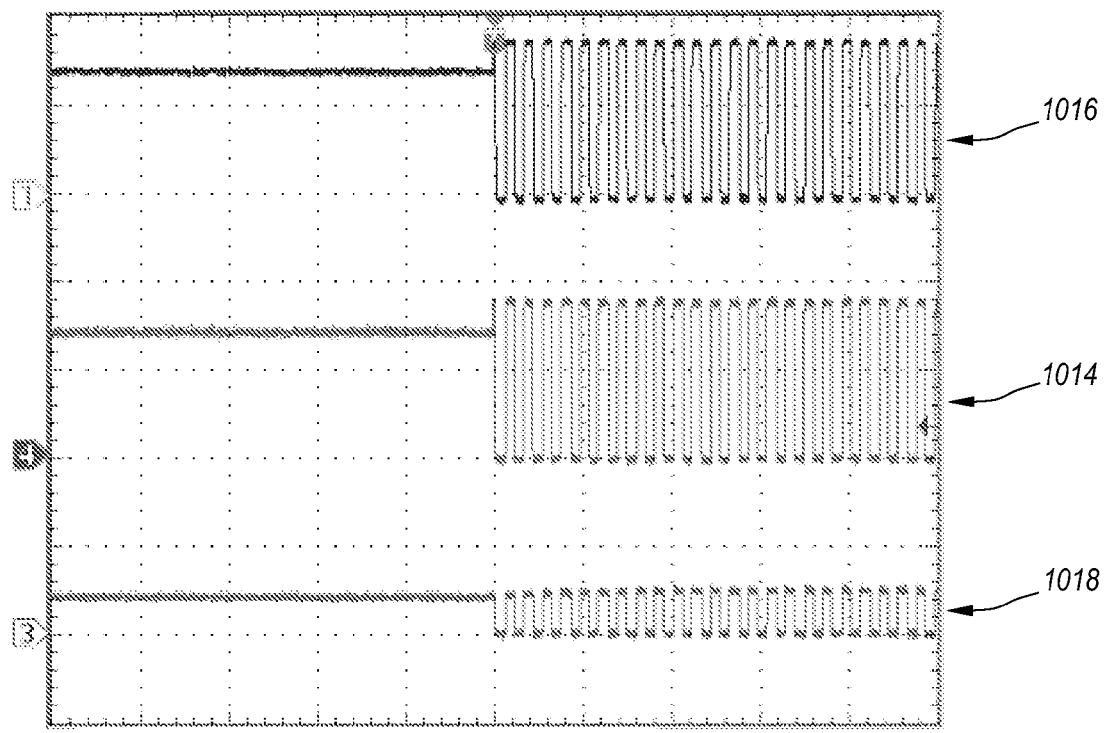
FIG. 13 shows three oscilloscope traces for a flashlight according to the present invention that was operated in a power reduction mode. The three traces reflect: (1) the voltage of the control signal from the microprocessor, (2) the voltage of the modified control signal generated by the power control circuit, and (3) the current flow through the electronic power switch.

FIG. 13 illustrates the operation of flashlight 10 of the illustrated embodiment in a power reduction mode. The power reduction mode was selected by holding switch 52 down for approximately 2 seconds. FIG. 13 shows three oscilloscope traces 1014, 1016, 1018. The oscilloscope traces of FIG. 13 were obtained from a flashlight having a power control circuit 700 as described above in connection with FIG. 8 to drive an electronic power switch 702 comprising a MOSFET 705. The resistor 701 had a value of 470 KΩ, the resistors 703 and 704 had a value of 1 KΩ and the capacitor 710 had a value of 0.1 μF. Thus, the time constant corresponding to input 707 of the power control circuit 700 was 47 ms while the time constant for input 709 was 0.1 ms.

The oscilloscope traces of FIG. 13 were obtained at a time when the flashlight switched from the normal "on" state to a power reduction mode and respectively reflect (1) how the voltage of a control signal of the microcontroller 601 of the flashlight shown in FIG. 1 may vary over time when the flashlight is operated in the power reduction mode, (2) how the voltage of the signal from the power control circuit 700, and hence the gate-to-source voltage of MOSFET 705, varied in response to the control signal of the microcontroller, and (3) how the current that traveled through MOSFET 705, and hence supplied to the lamp 59 of the flashlight, varied in response to the signal from the power control circuit.

The x-axis of FIG. 13 represents time in milliseconds, and the distance between each of the vertical grid lines crossing the x-axis represents 40 milliseconds. The y-axis of FIG. 13, however, represents different units or values depending on which signal or curve is being referenced.

Trace 1014 is an oscilloscope trace of the voltage of the control signal that was output from output pin 604 of microcontroller 601 as the flashlight 10 transitioned from a normal "on" mode to a power reduction mode. The flashlight was initially turned on by sending out a control signal from output pin 606 to input 707 of power control circuit 700 to energize lamp 59 relatively slowly as described above. Once the lamp reached a steady state, however, microcontroller ceased outputting the control signal on output pin 606 and began outputting the control signal from output pin 604 to input 709 of power control circuit 700. The time period reflected in the oscilloscope traces of FIG. 13 is after this transition had occurred.

The spacing between each of the grid lines crossing the y-axis for trace 1014 represent 2 Volts. Thus, as seen from FIG. 13, prior to transitioning to the power reduction mode, the voltage of control signal 1014 was at a steady state of approximately 3 Volts. After the flashlight transitioned to the power reduction mode, the voltage of control signal 1014 corresponded to a square wave. Each cycle of the square wave equaled approximately 8 milliseconds. During one half of the cycle, the voltage of the control signal was approximately 3.6 Volts, while during the other half the cycle the voltage of the control signal was 0 Volts.

Trace 1016 is an oscilloscope trace of the voltage of the control signal after passing through power control circuit 700 via input 709. Trace 1016 also corresponds to the gate-to-source voltage of MOSFET 705.

As with signal 1014, the spacing between each of the grid lines crossing the y-axis represents 2 Volts for trace 1016. Because the control signal 1014 passed through a portion of power control circuit 700 that had a very small time constant of 0.1 ms, the voltage of the modified control signal shown by curve 1018 tracks very closely to that of the control signal.

Trace 1018 of FIG. 13 is an oscilloscope trace of the current flow through MOSFET 705, and hence lamp 59, that resulted from the gate-to-source voltage being controlled in the manner illustrated by trace 1016. The spacing between each of the grid lines crossing the y-axis represents 2 Amps for trace 1016.

From curve 1018, it is observed that during the "on" portion of each cycle, no current spike is observed. Rather, the current through MOSFET 705 and lamp 59 returns to the steady state level of approximately 1 Amp each time signal 1016 goes to the high condition. This is because the filament is not powered only about 4 ms out of each cycle. This is insufficient for the filament of lamp 59 to cool to the point that it again acts like a short circuit. Because the lamp is driven at a rate of approximately 125 Hz, the human observer will not perceive any flickering in lamp 59, although lamp 59 will appear dimmer.

Lamp 59 will appear dimmer because lamp 59 is being operated at half its normal steady state power. The peak power of the flashlight during the power reduction mode is the same as that when the flashlight is operated in the normal mode. However, because the lamp is only powered for half of each cycle during the power reduction mode, its average power will be half its peak power. Further, the lamp will only consume half the energy it consumes during normal operation.

Notably, the trailing edge of each pulse in trace 1016 does not exhibit an exponential decay function corresponding to a time constant of 47 ms as seen with pulses 1004 in FIG. 12. This is because capacitor 710 is not drained through resistor 703 when the flashlight is operated in power reduction mode. Instead, when the flashlight is operated in the power reduction mode, another path to ground is provided through microcontroller 601, thus keeping the time constant of the decay function for input 709 at about 0.1 ms. This alternative path to ground is necessary if it is desired to drive lamp 59 at a rate of more than approximately 10 Hz, which is about the limit of the decay path through resistors 701, 703 based on the resistance values used in the present example and significantly below the 125 Hz at which lamp 59 was actually driven in the illustrated example.

The beacon mode will now be described. The flashlight may be placed in the beacon function mode, for example, by holding switch 52 down for a specific time or by depressing the switch 52 multiple times, thus providing microprocessor 601 an activation signal for the beacon mode.

In the beacon function mode, the microcontroller 601 is programmed in a way such that the flashlight lamp 59 comes on for a short period of time and then goes off for a longer period of time. The voltage of the control signal from output pin 606 of microprocessor 601 may be a step function that facilitates the flashlight lamp 59 to be repetitively cycled to come on for 0.03-0.25 seconds and then off for 1.2-2 seconds. Alternatively, the flashlight lamp 59 can be repetitively cycled to come on for 50 milliseconds and then off for 1.33 seconds. In this way, the beacon mode results in an eye-catching flash that is suitable for signaling, for example, the location of the flashlight holder to a rescuer or police officer in a time of need.

The period of the cycle during the beacon mode is not limited to a maximum of 2.25 seconds and may be up to five seconds or more, as desired. In the beacon mode according to the disclosed embodiment, during the "on" portion of the cycle, the voltage of the control signal is in the high condition, while during the "off" portion of the cycle the voltage of the control signal is 0 volts. Cycling the control signal in this way results in a great conservation of battery energy. For example, when the flashlight is operating in the beacon mode, the duty cycle is 0.05/1.38, or 3.6% in the "on" mode. In such a case, an energy consumption reduction of about 96% compared to a steady-on lamp can be achieved. A reduction in energy consumption is also achieved under other duty cycle ranges, e.g., at approximately 1.4% duty cycle or 30 milliseconds "on" and 2 seconds "off," or at approximately 17.2% duty cycle or 0.25 seconds "on" and 1.2 seconds "off." Those skilled in the art will recognize that this energy consumption benefit may be achieved independent of the type of lamp 59. Thus, this benefit can be realized whether the light source is an LED or a filament based lamp.

Figure 8:
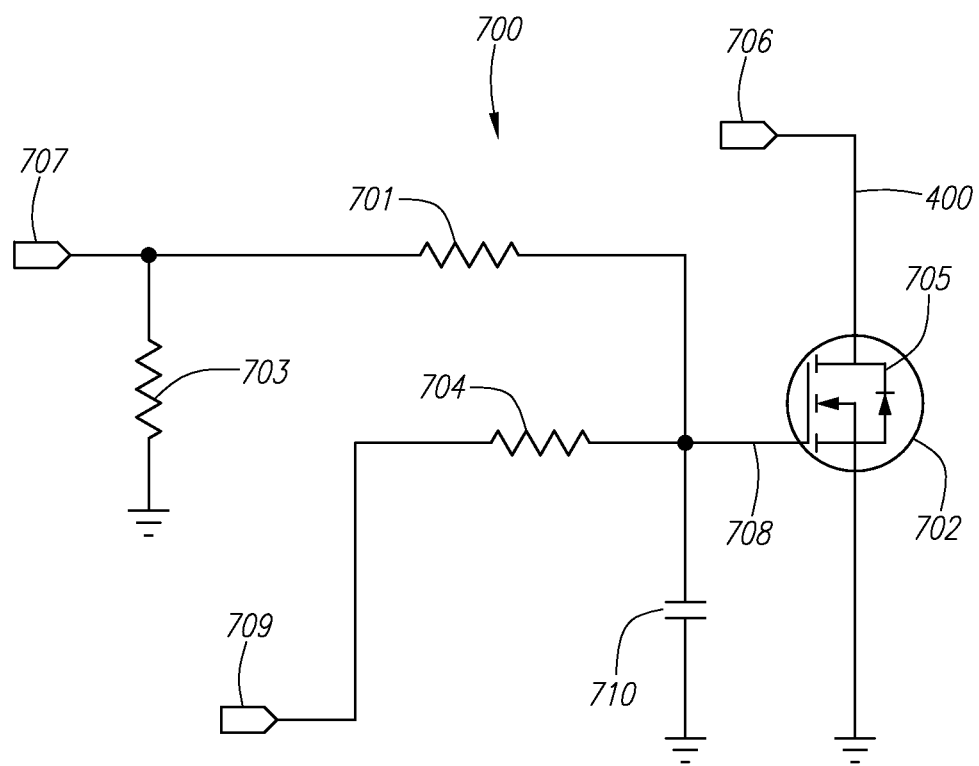
FIG. 8 is a circuit diagram of one embodiment of a power control circuit that may be employed in a flashlight according to the present invention.

The beacon mode may further be implemented with the power control circuit 700 by having the control signal from output pin 606 connect to input 707 or 709 as illustrated in FIG. 8. The "off" time during the beacon mode is sufficiently long to allow the filament of the flashlight lamp 59 to cool. Thus, modifying the control signal, for example, via the power control circuit 700 such that the signal provided to the electronic power switch 702 is increased exponentially serves to reduce the stresses placed on the filament of the lamp 59. In this way, the lamp will have an extended life expectancy in addition to the reduction in energy consumption advantageously facilitated by the beacon mode as described above.

Another and distinct aspect of the present invention relates to providing an improved short protection circuit for exposed charging contacts.

As best seen from FIGS. 1 and 5, charging contacts 44 and 48 serve as the interface between a recharging unit and rechargeable lithium-ion battery pack 60 of flashlight 10. Although not depicted here, it will be appreciated that the cradle of the recharging unit should be fashioned in a way to make electrical contact with the external charging contacts 44 and 48 and hold flashlight 10 in place while charging takes place. Because charging contacts 44 and 48 extend around the entire external circumference of flashlight 10, however, a recharging unit having a simple cradle design may be used. For example, a cradle design that permits flashlight 10 to be placed into the recharging unit in any radial orientation relative to its longitudinal axis and still be able to make contact with the recharging unit's charging contacts may be used. Thus, flashlight 10 does not need to be pressed into the charging unit so that hidden plugs or tabs can be inserted into the flashlight in order to make contact with the charging contacts of the recharging unit.

Because charging contacts 44 and 46 are externally exposed, however, there is a potential that they become shorted by a metal object in the user's hands during operation. To avoid tripping the short circuit protection circuitry 86 provided in lithium-ion battery pack 60 in such circumstances, a short protection circuit 800 is preferably electrically interposed between at least one of the charging contacts 44, 48 and the rechargeable lithium-ion battery pack 60.

In the embodiment illustrated in FIG. 5, charging contact 44 is electrically connected to short protection circuit 800, which in turn is connected to electrical path 402 and center electrode 63 of battery pack 60 by way of conductor 821 and via 64. Charging contact 48 is also coupled to short protection circuit 800. In addition, it is connected via barrel 21, conductive member 72 and spring 74 to case electrode 61 of battery pack 60.

While in the present embodiment, short protection circuit 800 is located on printed circuit board 46, short protection circuit 800 could be physically located at any suitable location within flashlight 10.

The short protection circuit 800 operates to create an open circuit between the battery pack 60 and at least one of the charging contacts 44, 48 if a short is detected between charging contacts 44, 48. Thus, flashlight 10 may be operated safely without fear that an inadvertent short across charging contacts 44, 48 will interrupt the flow of current from battery pack 60 to lamp 59 during operation of the flashlight.

A detailed description of one embodiment of a short protection circuit 800 is described in connection with FIGS. 9A and 9B below.

Figure 9A:
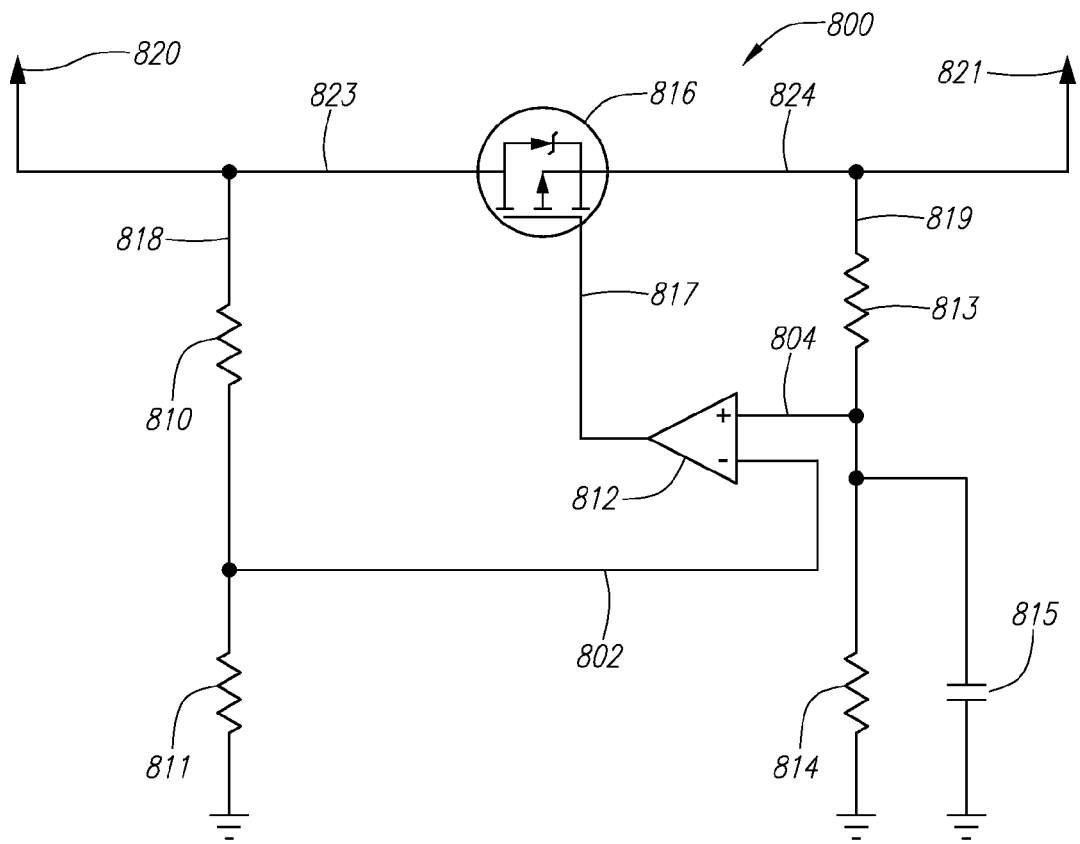
FIG. 9A is a circuit diagram of one embodiment of a short prevention circuit according to the present invention.

The short protection circuit 800 shown in FIG. 9A operates, essentially, as an automatic switch between external charging contact 44 and battery pack 60.

Circuit 800 comprises a switch 816 that is controlled by a comparing device 812. In the present embodiment, switch 816 is interposed in an electrical path between the charging contact 44 and the positive electrode 63 of battery pack 60. In particular, conductors 820 and 823 connect one side of switch 816 to charging contact 44 and conductors 821 and 824 connect the other side of switch 816 to the center electrode of battery pack 60.

Switch 816 in the illustrated embodiment is a p-channel MOSFET, but other electronic switching devices may also be employed. For example, other types of transistors may be employed for switch 816, including bipolar junction transistors and other field effect transistors, such as JFETs and DE MOSFETs.

Comparing device 812 in the present embodiment comprises a voltage comparator. However, an op amp, microprocessor, or Application Specific Integrated Circuit (ASIC) may also be used for comparing device 812.

Figure 9B:
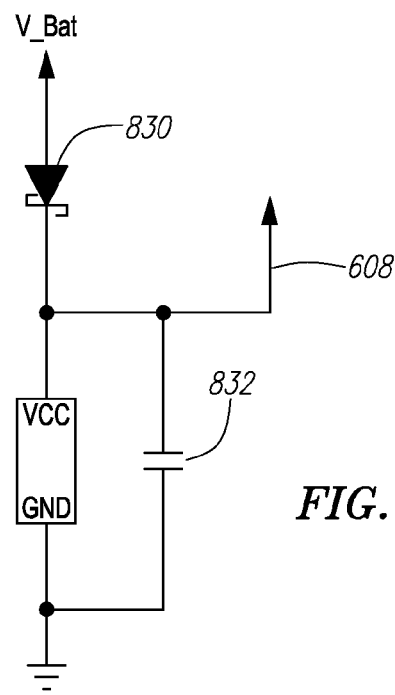
FIG. 9B is a circuit diagram of one example of a power supply circuit for a comparing device employed in short prevention circuit of FIG. 9A.

One example of a power supply circuit for comparing device 812 is shown in FIG. 9B. As shown in FIG. 9B, the Vcc pin of comparing device 812, is connected to the positive terminal of battery pack 60 and the GND pin of comparing device 812 is connected to ground. Although unnecessary, the Vcc pin is preferably connected to the positive terminal of the battery pack 60 through a Schottky diode 830 to provide basic filtering to the signal from the battery. A capacitor 832, of preferably 0.1 µF, is provided in parallel with the Vcc and GND pins of the comparing device. The battery signal filtered by Schottky diode 830 may be provided via trace 608 to the Vcc pin of microcontroller 601 to power the microcontroller.

Comparing device 812 compares the voltage of the signal provided on input 802 to the voltage of the signal provided on input 804. Based on the comparison made, and the transfer characteristics of the comparing device, an output signal is provided on output 817 to control switch 816. However, because switch 816 is a p-channel MOSFET in the illustrated embodiment, a negative gate-to-source voltage is required to enable switch 816 to conduct current.

In the present embodiment, if the voltage of the signal on input 804 is greater than the voltage on input 802, then the comparing device 812 will produce a signal with a positive voltage on output 817 that is substantially equal to or greater than the voltage generated by battery pack 60 on conductor 824. As a result, the MOSFET comprising switch 816 is disabled, and the circuit path between charging contact 44 and the center electrode 63 of battery pack 60 will be opened. On the other hand, if the voltage of signal on input 802 is greater than or equal to the voltage of the signal on input 804, then the comparing device 812 will output no signal (or a 0 Volt signal) on output 817. Switch 816 will be enabled to conduct current between charging contact 44 and the center conductor 63 of battery pack 60 under these circumstances because the gate-to-source voltage of the MOSFET will be negative.

In the embodiment illustrated in FIG. 9A, the voltage of signal on input 802 will correspond to the voltage drop across resistor 811 provided between charging contact 44 and the case electrode, or ground, of battery pack 60. To ensure that complete charging of battery pack 60 may be achieved, resistor 811 is preferably selected to have a resistance slightly greater than that of resistor 810 so that a larger voltage drop occurs across resistor 811 than resistor 810 during the charging process. Preferably resistor 811 has a resistance that is greater than 50% and less than or equal to about 60% of the combined total resistance for resistors 810, 811.

The voltage of the signal provided on input 804 will correspond to the voltage stored on capacitor 815, which in turn will depend on the respective resistances of resistors 813 and 814 in electrical path 819. In particular, because capacitor 815 is provided in parallel with resistor 814, the voltage stored on capacitor 815 will equal the voltage drop across resistor 814. Preferably, resistors 813 and 814 are selected to have equal values so that following equilibrium capacitor 815 will have a charge that corresponds to approximately one half the voltage of battery pack 60.

By way of illustration, resistors 810, 813, and 814 may each have a resistance of 100 KΩ, and resistor 811 may have a resistance of 120 KΩ. Capacitor 815 may have a capacitance of 0.1 µF. With these values, the voltage of the signal on input 804 will comprise approximately one half of the voltage of battery pack 60 once capacitor 816 is charged and equilibrium is achieved in the circuit. On the other hand, the voltage drop across resistor 811, and hence the voltage of the signal on input 802, will comprise approximately 55% of the voltage drop between charging contact 44 and ground.

When the flashlight 10 is placed into its charging unit, external charging contacts 44, 48 will come into contact with corresponding charging contacts of the charging unit so that energy may flow to the battery pack. Based on the foregoing arrangement of short protection circuit 800, as long as the voltage on charging contact 44 is greater than or equal to the voltage of the battery pack 60, then flashlight 10 is determined to be in the charging mode and switch 816 will be enabled to pass current. This is because the voltage drop across resistor 811 will be greater than the voltage stored on capacitor 815 in such circumstances. As a result, comparing device 812, which is a voltage comparator in the present embodiment, will signal switch 816 to close, thereby permitting energy to flow from charging contact 44 to the battery pack 60 along lines 820, 823, 824, and 821 and the recharging of battery pack 60 to take place.

Further, switch 816 in the present embodiment will remain open once the flashlight is removed from the charging cradle. This is because charging contact 44 will be at the same potential as the center electrode 63 as long as switch 816 is open, and, thus, the voltage of the signal on input 802 will remain larger than the voltage of the signal on input 804.

However, if the charging contacts 44 and 48 are shorted together, the voltage between charging contact 44 and ground will quickly drop to zero volts, as will the voltage drop across resistor 811. In response, comparing device 812 will detect that charging contact 44 is at a lower voltage than the battery and open switch 816 by sending a signal having a large positive voltage to switch 816 via output 817. Comparing device 812 will disable switch 816 in response to a detected short more quickly than the internal short protection circuitry 86 can detect and clear a short. Because the internal short circuit protection circuitry 86 is not triggered in such circumstances, battery pack 60 can continue to supply energy to lamp 59 without interruption by the built-in short circuit protection circuitry 86.

In the present embodiment of short protection circuit 800, once a short is detected between charging contacts 44 and 48, switch 816 will not open again until the short is removed and the voltage drop between charging contact 44 and ground is approximately equal to or greater than the voltage of battery pack 60. In other words, switch 816 will not open again until flashlight 10 is placed in its corresponding charging unit.

In addition to flashlights, short protection circuit 800 may also be beneficially used in other rechargeable devices in which charging contacts are exposed. Further, while short protection circuit 800 is particularly useful when the power source for a portable electronic device is a rechargeable lithium-ion battery pack, short protection circuit 800 may also be used advantageously in rechargeable devices powered by other rechargeable DC power sources.

While various embodiments of an improved flashlight and its respective components have been presented in the foregoing disclosure, numerous modifications, alterations, alternate embodiments, and alternate materials may be contemplated by those skilled in the art and may be utilized in accomplishing the various aspects of the present invention. For example, the power control circuit and short protection circuit described herein may be employed together in a flashlight or may be separately employed. Further, the short protection circuit may be used in rechargeable electronic devices other than flashlights. Thus, it is to be clearly understood that this description is made only by way of example and not as a limitation on the scope of the invention as claimed below.

What is claimed is:

1. A portable lighting device comprising:
   a main power circuit including a power source, a light source, and an electronic power switch adapted to regulate current flow through the main power circuit in response to a voltage;
   a power control circuit electrically coupled to the electronic power switch and adapted to provide the voltage in response to a control signal; and
   a microprocessor including an output that is coupled to the power control circuit, wherein the microprocessor provides the control signal to the power control circuit, and the control signal is cycled with a sufficient duration to provide a visible flashing function to the portable lighting device, wherein the visible flashing function is performed through the light source.

2. A portable lighting device according to claim 1, wherein the light source has a duty cycle less than 17.2%.

3. A portable lighting device according to claim 2, wherein the duty cycle is between 1.4% and 17.2%.

4. A portable lighting device according to claim 1, wherein a period of the visible flashing function is approximately 1.38 seconds.

5. A portable lighting device according to claim 1, wherein a period of the visible flashing function is greater than about 1 second and less than 5 seconds.

6. A portable lighting device according to claim 1, wherein said power control circuit regulates the electronic power switch when the portable lighting device is turned on to limit the peak current that flows through the main power circuit prior to the main power circuit reaching a steady state.

7. A portable lighting device according to claim 1, wherein the power circuit modifies the control signal to produce the voltage, and wherein the voltage increases exponentially over time.

8. A portable lighting device according to claim 1, wherein the light source includes a filament.

9. A portable lighting device according to claim 1 wherein the "on" portion of the visible flashing function is between 30 milliseconds and 250 milliseconds.

10. A portable lighting device according to claim 1 further including a mechanical switch for opening and closing an electrical path between the power source and the microprocessor, wherein the microprocessor provides the control signal to the power control circuit in response to an activation signal received from the mechanical switch.

11. A flashlight comprising:
    a main power circuit including a power source, a light source, and an electronic power switch that regulates the current flow through the main power circuit;
    a microprocessor;
    a power control circuit electronically coupled to the electronic power switch and microprocessor, the power control circuit adapted to provide a voltage to the electronic power switch in response to a control signal from the microprocessor;
    wherein the control signal has a period of greater than about 1 second, and wherein the power control circuit regulates current flow through the electronic power switch in response to the control signal from the microprocessor to provide a visible flashing function for the flashlight, wherein the visible flashing function is performed through the light source.

12. A flashlight according to claim 11, wherein the light source has a duty cycle of less than 17.2%.

* * * * *